(12) United States Patent
Kawada et al.

(10) Patent No.: US 7,239,432 B2
(45) Date of Patent: Jul. 3, 2007

(54) DRUM SURFACE SCANNER AND METHOD FOR PLATE SIZE CHECK

(75) Inventors: Toru Kawada, Kyoto (JP); Toshio Tamura, Kyoto (JP); Ryuzo Tokimasa, Kyoto (JP); Susumu Takahashi, Kyoto (JP)

(73) Assignee: Dainippon Screen MFG. Co., Ltd., Kyoto (JP)

( * ) Notice: Subject to any disclaimer, the term of this patent is extended or adjusted under 35 U.S.C. 154(b) by 1086 days.

(21) Appl. No.: 10/140,954

(22) Filed: May 9, 2002

(65) Prior Publication Data

US 2002/0167688 A1    Nov. 14, 2002

(30) Foreign Application Priority Data

May 11, 2001 (JP) .............................. 2001-142344
May 11, 2001 (JP) .............................. 2001-142346

(51) Int. Cl.
*H04N 1/04* (2006.01)

(52) U.S. Cl. .................... 358/474; 358/400; 271/37; 250/234; 359/197

(58) Field of Classification Search ................ 250/234; 359/197; 271/37; 358/400, 474, 199, 409
See application file for complete search history.

(56) References Cited

U.S. PATENT DOCUMENTS

| | | | |
|---|---|---|---|
| 4,317,138 A * | 2/1982 | Bryan et al. ................. | 358/449 |
| 4,750,045 A | 6/1988 | Ohara et al. | |
| 4,764,815 A * | 8/1988 | Landsman .................. | 358/496 |
| 4,809,086 A * | 2/1989 | Horiya ........................ | 358/496 |
| 5,406,365 A * | 4/1995 | Baba et al. .................. | 399/358 |
| 5,946,527 A * | 8/1999 | Salgado et al. ............... | 399/82 |
| 6,213,020 B1 | 4/2001 | Kawada et al. | |
| 6,425,578 B1 * | 7/2002 | Wood et al. .................. | 271/37 |

FOREIGN PATENT DOCUMENTS

| | | |
|---|---|---|
| EP | 0 581 049 A1 | 2/1994 |
| JP | 08-029968 | 2/1996 |
| JP | 2000-56467 | 2/2000 |
| JP | 2001-113849 | 4/2001 |

* cited by examiner

*Primary Examiner*—Aung S. Moe
*Assistant Examiner*—Heather D Gibbs
(74) *Attorney, Agent, or Firm*—McDermott Will & Emery LLP

(57) ABSTRACT

Provided is a drum surface scanner with which punched holes and/or cuts can be formed in a plate which has been correctly defined by position, and the plate can be clamped to a recording drum. When a plate P comes in front of movable pins 113, i.e., on a hole punch unit 4 side, the upper roller of a conveyor roller 125 moves down, and conveyor rollers 124 and 125, and conveyor belts 111 all start rotating in the positive direction. Once the plate P moves out of the range covered by a sensor PH159, the movable pins 113 follow the tail end of the plate P at a given distance therefrom. When the front end of the plate P reaches the hole punch unit 4, the movable pins 113 which have been chasing the plate P push the tail end thereof to make the front end thereof abut to the hole punch unit 4. At the same time, based on the movement amount of the movable pins 113 from their original positions to current positions pushing the tail end of the plate P, the plate P is checked for its length Y. Plate conveyance with respect to positioning pins 51 on the recording drum 5 is carried out in a similar manner.

10 Claims, 33 Drawing Sheets

DRUM SURFACE SCANNER AND METHOD FOR PLATE SIZE CHECK

BACKGROUND OF THE INVENTION

1. Field of the Invention

The present invention relates to drum surface scanners and methods for plate size check and, more specifically to, in a drum surface scanner in which a plate positioned by a hole punch unit and then attached to a recording drum is exposed by means of light beam scanning, a mechanism for conveying the plate to the hole punch unit and the recording drum, and a method for plate size check employed by the mechanism.

2. Related Art Statement

Color printouts require an exposure process, a printing process, and several others before completion. Prior to the exposure process, an original image for color printing is separated into several colors, typically four colors of Y (yellow), M (magenta), C (cyan), and K (black), and image data is generated for each of the resulting colors. The resulting image data is provided to a drum surface scanner for use in the exposure process. The drum surface scanner includes a recording drum, around which a sheet plate is installed. The sheet plate is exemplified by a presensitized plate (PS plate), which is made of aluminum, plastic, paper, and others, previously coated with a photosensitive coating.

In the exposure process, based on the provided image data, the drum surface scanner exposes the plate installed around the recording drum for image printing thereon for each color as a result of color separation. That is, in a case where an original image is separated into four colors of YMCK, four images differing in color are each printed onto a plate, i.e., four plates in total.

In the printing process, used is a printer of a type applying inks corresponding in color to the image-printed plates to produce multi-colored printouts. At printing, if image shifting occurs to the plates printed with each different colored image, the resulting color printouts will be poor in quality. In order to prevent such image shifting, the plates usually each have punched holes at predetermined positions to use as a basis for position setting at printing. These punched holes are also used as a basis for image printing onto plates. Thus, a hole punch unit for forming such punched holes is provided to the drum surface scanner. With the aid of such punched holes, the drum surface scanner becomes free from image shifting occurring to plates, leading to high-quality color printouts provided by the printer.

Such a conventional drum surface scanner is disclosed in Japanese Patent Laid-Open Publication No. 2000-56467. As to the disclosed drum surface scanner, only its plate conveyor mechanism having relevance to the present invention is described briefly below.

FIG. 20 is an exploded view showing the structure of the conventional drum surface scanner. In the conventional drum surface scanner, an almost parallelepiped-shaped frame 1 is attached with a conveyor mechanism 2, a drive mechanism 3, a hole punch unit 4, a recording drum 5, and others. The drive mechanism 3 is not shown in FIG. 20 to avoid impairing clarity. FIG. 21 is a cross-sectional view of the main part of the conveyor mechanism 2, cut along a line A-A' and viewed from the direction of an arrow B of FIG. 20.

In FIGS. 20 and 21, the conveyor mechanism 2 includes a lower tray 22, an upper tray 23, feed rollers 24, a conveyor roller 25 for plate loading, and a conveyor roller 26 for plate unloading. The lower tray 22 and the upper tray 23 are held securely in position to be a single piece between two side panels 21. The feed roller 24, and the conveyor rollers 25 and 26 are all rotatable, and also held securely in position between the two side panels 21. The feed roller 24 is used to convey plates placed on the lower tray 22 in the direction of the conveyor roller 25. The conveyor roller 25 is configured by two rollers, those of which are so arranged as to abut each other at the tip of the lower tray 22. Similarly, the conveyor roller 26 is also configured by two rollers, those of which are so arranged as to abut each other at the tip of the upper tray 23. The conveyor roller 25 and the feed roller 24 are each coupled, through a belt (not shown), with a motor M50 which is securely fixed to both of the side panels 21. The motor M50 drives both the conveyor roller 25 and the feed roller 24 into rotation. The conveyor roller 26 is coupled with, through another belt (not shown), a motor M54 which is also securely fixed to both of the side panels 21. The motor M54 drives the conveyor roller 26 into rotation.

The lower and upper trays 22 and 23 are provided, respectively, with small holes 27 and 28, and directly therebelow, sensors PH50 and PH54 are each affixed. These sensors PH50 and PH54 are used to detect whether there is any plate placed directly above the small holes 27 and 28, respectively.

The conveyor mechanism 2 structured as such is securely placed onto the upper part of the frame 1, as indicated by a one-dot arrowed line α in FIG. 20. Here, the conveyor mechanism 2 rotates at a predetermined angle about a rotary shaft 29 protruding outwardly from those two side panels 21 (see an arrow β in FIGS. 20 and 21).

The drive mechanism 3 is incorporated to rotate the conveyor mechanism 2 as such. FIG. 22 shows the drive mechanism 3 viewed from the direction of an arrow C shown in FIG. 20.

In FIG. 22, the drive mechanism 3 includes, two of each, a cum follower guide 31, a motor M55, a cum gear 32, and a cam follower 33. The drive mechanism 3 also includes, at least one of each, a sensor detection panel 34, a sensor PH55, and a sensor PH56.

The cum follower guides 31 each have a parallelepiped shape, and an oval-shaped through hole is formed therein. The cum follower guides 31 are fixedly attached to the side panels 21, respectively, such that the through holes are faced to each other via the conveyor mechanism 2. The motors M55 are placed proximal to the side panels 21, respectively, to face each other via the conveyor mechanism 2, and fixed to the frame 1. The cum gears 32 are also fixed to the frame 1 in such a manner as to face to each corresponding side panel 21. Here, the cum gears 32 are each driven by the corresponding motor M55 into rotation about their own shafts. The cum followers 33 are fixed, respectively, in such a position as to move in a circle, around the shaft of the corresponding cum gear 32, on the outer parts of one plane of the cum gear 32, i.e., the plane facing to the corresponding side panel 21. The cum follower 33 is disk-shaped, a diameter of which is almost the same as the narrower diameter of the through hole of the cum follower guide 31, and thus perfectly fits in the through hole. With such a structure, the cum follower 33 couples together the cum follower guide 31 and the gum gear 32, so that the conveyor mechanism 2 is supported by the drive mechanism 3. The disk-shaped sensor detection panel 34 is placed concentrically around the corresponding cum gear 32, and rotates together therewith. The sensor detection panel 34 has a slit 35 formed in the outer parts thereof. In order to detect the slit 35 in the rotating sensor detection panel 34, the sensors PH55 and PH56 are securely fixed to the frame 1.

With such a structure, the sensors PH55 and PH56 both become able to detect the slit 35 which does not stay at the same position, and the drive mechanism 3 moves and stops the conveyor mechanism 2 to/at its upper and lower positions.

Described next is the hole punch unit 4 of FIG. 20. FIG. 23 shows a cross-sectional view of the hole punch unit 4, cut along a line E-E' and viewed from the direction of an arrow F of FIG. 20.

In FIG. 20, the hole punch unit 4 includes at least two punchers 41, and a mounting member 42. The punchers 41 each mainly include, as shown in FIG. 23, a main body 43, a sensor PH62, a motor M60, and a punch 44. The main body 43 has a gap 45, into which a plate coming over a first supply pass line (will be described later) is inserted. The sensor PH62 detects plate insertion into the gap 45. Once the sensor PH62 detects plate insertion, the motor M60 starts driving. With the aid of a cum mechanism (not shown) in the main body, the driving power eventually moves the punch 44 up and down. As the punch 44 moves up and down responding to the power provided by the cum mechanism, the plate inserted in the gap 45 is punched in. As such, the resulting plate has punched holes and/or cuts formed at one end thereof. The mounting member 42 has a parallelepiped shape, and a gutter 46 is formed along the longitudinal direction thereof. To the gutter 46, the corresponding puncher 41 is attached. Such a hole punch unit 4 is securely fixed onto the frame 1 as indicated by a one-dot arrowed line 6 shown in FIG. 20.

Described next is a recording drum 5 shown in FIG. 20. FIG. 24 shows the recording drum 5 and components locating proximal thereto, cut along a line G-G' and viewed from the direction of an arrow H of FIG. 20.

In FIGS. 20 and 24, the recording drum 5 is placed within the frame 1, specifically, in such a position diagonally below the conveyor mechanism 2 and the hole punch unit 4. The recording drum 5 has an almost cylindrical shape, and rotates about its own shaft responding to the driving power coming from a motor M1. To the outer surface (annular surface) of the recording drum 5, a plate P (see a shaded part of FIG. 20) coming over a second supply pass line (will be described later) is installed therearound. Further, the drum surface scanner includes, for the purpose of securely place the plate P on the recording drum 5, at least two positioning pins 51, a head clamp 52, and a tail clamp 53. As shown in FIG. 20, these positioning pins 51 are securely affixed onto the outer surface of the recording drum 5 so as to be aligned parallel to the center axis thereof. Thereby, the positioning pins 51 can clamp one end of the plate coming over the second supply pass line.

Next, referring to FIGS. 25 to 33, a sequence of processes executed by the components described in the foregoing will be described in detail.

First, the plate P is provided to the lower tray 22 of the conveyor mechanism 2 (see FIG. 25). This plate supply is done manually by operators, or automatically by an automatic plate supply mechanism (not shown) additionally provided to the drum surface scanner. Once the sensor PH50 detects that the plate P has been supplied, the conveyor mechanism 2 moves the lower tray 22 to its upper position for a punching process. As a result, the conveyor roller 25 of the conveyor mechanism 2 and the gap 45 of the hole punch unit 4 are aligned straight, so that the first supply pass line as indicated by a two-dot arrowed line η is formed therebetween (see FIG. 26). Then, the feed roller 24 and the conveyor roller 25 rotate (positive rotation) in such a direction that the plate P moves from the conveyor mechanism 2 towards the hole punch unit 4 (see an arrow θ). With such a rotation, the plate P is conveyed over the lower tray 22 to the first supply pass line (see FIG. 27). Here, on the way in the first supply pass line, the plate P is adjusted in position with respect to the punchers 41 by a centering mechanism, which is not shown. As a result of position adjustment, the plate P preferably has two punched holes and/or cuts formed symmetrically with respect to the center line thereof. The resulting plate P after position adjustment is then guided to the gap 45 of the corresponding puncher 41.

In the hole punch unit 4, if the sensor PH62 of the corresponding puncher 41 detects that one end of the plate P has reached thereto, the plate P is formed with punched holes and/or cuts at predetermined positions thereof. Here, in the case with cuts, those are formed in the same shape at the same pitch as the positioning pins 51 which are securely affixed onto the recording drum 5. In the case with punched holes, those are formed in the same shape at the same pitch as pins provided to a printer (not shown) which is used in the printing process.

After the punching process, the feed roller 24 and the conveyor roller 25 rotate (negative rotation) in a direction from the hole punch unit 4 to the conveyor mechanism 2 (see an arrow ι) at, almost, a constant speed. As a result, the punched plate P moves backward over the first supply pass line to be on the lower tray 22 again (see FIG. 28). In response to such a movement of the punched plate P, the conveyor mechanism 2 moves the lower tray 22 to its lower position to have it face to the recording drum 5, i.e., to have the line extended straight from the conveyor roller 25 abut the outer surface of the recording drum 5 (see FIG. 29). In this manner, the second supply pass line is established between the conveyor roller 25 and the recording drum 5. Then, the feed roller 24 and the conveyor roller 25 rotate positively to forward the punched plate P from the lower tray 22 onto the second supply pass line in the direction of the recording drum 5 (see an arrow λ). The forwarded plate P is then defined by position with respect to the recording drum 5 by the cuts formed at one end as fitting into the positioning pins 51.

Thereafter, a first clamp drive (not shown) drives the head clamp 52 to clamp one end of the plate P. In response, the recording drum 5 rotates (positive rotation) in a direction indicated by an arrow μ of FIG. 30. As a result, the plate P is wound around the recording drum 5 while being ejected from the lower tray 22 (see FIG. 31).

After the exposure process to the plate P, the exposed plate P installed around the recording drum 5 is unloaded as below.

The recording drum 5 rotates in an opposite direction (negative rotation) to unload the plate P to the conveyor roller 26 through an ejection pass line which is indicated by a two-dot arrowed line ρ in FIG. 32. The conveyor roller 26 then rotates in the direction indicated by an arrow τ in FIG. 33, i.e., such a direction that the plate P coming over the ejection pass line is moved to the upper tray 23. As a result, the plate P is provided onto the upper tray 23 (FIG. 33).

The issue here is that such a conventional drum surface scanner bears the following problems. First, plate conveyance to the hole punch unit 4 and the recording drum 5 is dependent only on the movement of the feed roller 24 and the conveyor roller 25.

Therefore, if the feed roller 24 and the conveyor roller 25 get dirty and thus reduced in their conveyance capabilities, for example, plate conveyance may not be completed to the predetermined position of the corresponding puncher 41, specifically, until the plate perfectly fits in the gap 45. If this is the case, without position adjustment, the plate may be formed with punched holes and/or cuts. It should be noted here that the sensor PH62 provided to each puncher 41 merely detects plate insertion into the gap 45, and thus is not capable of detecting whether the plate has been correctly positioned.

Moreover, problematically, the plate is not completely conveyed until its cuts abut the positioning pins 51 of the recording drum 5. As a result, the plate is clamped without correctly defined by position, and the exposure process get started.

There is another problem about plate size in the conventional drum surface scanner. In detail, plates used in the drum surface scanner vary in size, and thus settings are accordingly made to the scanner depending on what plate size is to be applied thereto. The scanner follows the settings for a sequence of processes. However, this does not always work appropriately if plate supply is made manually by operators, possibly resulting in mistakes such that the plate supplied to the lower tray 22 of the conveyor mechanism 2 will be wrong in size, different from the previously-made settings. The conventional drum surface scanner detects the plate size to prevent mistakes of the type, but such detection is not enough.

The reason is that, in the conventional drum surface scanner, plate size detection is not made at once. In detail, with respect to the heading direction of the plate, the width X of the plate is detected at the time of centering process in the hole punch unit 4, while the length Y of the plate is detected at the time of conveyance to the recording drum 5, i.e., calculated from the rotation amount of the recording drum 5 when the tail end of the plate is detected. Accordingly, if the plate wrong in length Y is supplied to the lower tray 22, the plate resultantly goes all the way to the recording drum 5.

SUMMARY OF THE INVENTION

Therefore, an object of the present invention is to provide a drum surface scanner in which plates can be securely positioned correctly before being formed with punched holes and/or cuts or clamped to a recording drum by including, in addition to such a conventional conveyor mechanism using rollers, an auxiliary conveyance mechanism.

Another object of the present invention is to provide a drum surface scanner in which plates can be checked for its length Y, and a method therefor.

The present invention has the following features to attain the objects above.

A first aspect of the present invention is directed to a drum surface scanner including a conveyance unit for conveying a plate to an exposure unit in which the plate is attached to a recording drum for scanning and exposure. The conveyance unit comprises: a tray on which the plate is placed; a conveyance member including a roller which is rotatable in both positive and negative directions, and placed to abut the plate at the tip of the tray with respect to a plate conveyance direction; and a pair of movable pins which are protruding from an upper surface of the tray, placed symmetric with respect to the plate conveyance direction, and made movable towards both the plate conveyance direction and a direction opposite thereto. At the time of plate conveyance towards the exposure unit, the roller rotates in the positive direction to forward the plate, and the movable pins push a tail end of the plate.

As described above, in the first aspect, the movable pins are used to push the tail end of the plate. With such a structure, the plate can be clamped to the recording drum after accurate position adjustment.

Here, the roller of the conveyance member is preferably configured by a pair of rollers for holding the plate therebetween. It may be more preferable if release means is provided for releasing the plate held between the pair of rollers. If provided, the release means may release the plate held between the pair of rollers before a front end of the plate to be conveyed towards the exposure unit is securely fixed on the recording drum.

In such a case that the release means releases the plate held between the pair of rollers before the front end of the plate to be conveyed towards the exposure unit is securely fixed on the recording drum, if a hole punch unit for forming a punched hole and/or a cut in the plate is further provided, the roller of the conveyance member may rotate to forward the plate, and the movable pins may push a tail end of the plate to convey the plate from the conveyance unit towards the hole punch unit.

At this time, preferably, the release means releases the plate held between the pair of rollers at a predetermined position in front of the hole punch unit before the front end of the plate to be conveyed towards the hole punch unit reaches the hole punch unit.

Such a structure enables correct positioning at the time of plate supply not only to the recording drum but to the hole punch unit. As a result, there is no more need for the process for forming punched holes and/or cuts after accurate position adjustment.

Also in the case that the release means releases the plate held between the pair of rollers before the front end of the plate to be conveyed towards the exposure unit is securely fixed on the recording drum, the tray preferably further includes a conveyor belt, and as the conveyor belt moves, the plate placed thereon may be forwarded towards the exposure unit.

As such, the tray onto which the plate is supplied may be configured like a belt, plates varying in size become applicable.

Still further, preferably, the movable pins may be made to fall to the conveyor belt to be located therebelow in the plate conveyance direction. Also, those movable pins may be automatically fit in the tray at predetermined positions.

Such a structure enables the plate to be placed on the tray even if the plate comes from behind the movable pins (from the direction opposite to the plate conveyance direction), i.e., even if the plate is automatically provided by an automatic plate supply mechanism and others.

Further, in the first aspect, a hole punch unit may be further included for forming a punched hole and/or a cut in the plate, and at the time of plate conveyance towards the hole punch unit, in the conveyance unit, the roller of the conveyance member may rotate to forward the plate, and the movable pins may push a tail end of the plate.

Such a structure enables correct positioning at the time of plate supply not only to the recording drum but to the hole punch unit. As a result, there is no more need for the process for forming punched holes and/or cuts after accurate position adjustment.

Here, the roller of the conveyance member is preferably configured by a pair of rollers for holding the plate therebetween. It may be more preferable if release means is provided for releasing the plate held between the pair of rollers. If provided, the release means may release the plate held between the pair of rollers before a front end of the plate to be conveyed towards the hole punch unit is punched in by the hole punch unit.

Also in the case that the release means releases the plate held between the pair of rollers before the front end of the plate to be conveyed towards the hole punch unit is punched in by the hole punch unit, the tray preferably further includes a conveyor belt, and as the conveyor belt moves, the plate placed thereon may be forwarded towards the hole punch unit.

As such, the tray onto which the plate is supplied may be configured like a belt, plates varying in size become applicable.

Still further, preferably, the movable pins may be made to fall to the conveyor belt to be located therebelow in the plate conveyance direction. Also, those movable pins may be automatically fit in the tray at predetermined positions.

Such a structure enables the plate to be placed on the tray even if the plate comes from behind the movable pins (from the direction opposite to the plate conveyance direction), i.e., even if the plate is automatically provided by an automatic plate supply mechanism and others.

A second aspect of the present invention is directed to a drum surface scanner including a hole punch unit for punching a plate in, and a conveyance unit for conveying the plate to the hole punch unit and an exposure unit in which the plate is attached to a recording drum for scanning and exposure. the conveyance unit comprises: a tray on which the plate is placed; a conveyance member including a roller which is rotatable in both positive and negative directions, and placed to abut the plate at the tip of the tray with respect to a plate conveyance direction; a pair of movable pins which are protruding from an upper surface of the tray, placed symmetric with respect to the plate conveyance direction, and made movable towards both the plate conveyance direction and a direction opposite thereto; and a detection section for detecting a movement amount of the movable pins from original positions thereof. The movable pins are pushed into a tail end of the plate conveyed by the roller towards the hole punch unit, and based on the movement amount detected from positions at which the movable pins are pushed, a length of the plate is determined.

Here, it is preferable that the length of the plate can be determined before the plate is punched in.

As described above, in the second aspect, the plate can be checked for its length Y before the punching process applied thereto by the hole punch unit, successfully preventing a waste even if plate supply has been wrong in size, i.e., length Y.

A third aspect of the present invention is directed to a plate size check method for determining a length of a plate. The method comprises the steps of: conveying a plate from a tray to a conveyance destination, pushing a pair of movable pins placed symmetric with respect to a plate conveyance direction into a tail end of the plate conveyed to the conveyance destination; detecting a movement amount of the movable pins from predetermined original positions to positions at which the movable pins are pushed; and determining the length of the plate based on the detected movement amount.

Here, it is preferable that the conveyance destination is a hole punch unit for punching the conveyed plate in.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
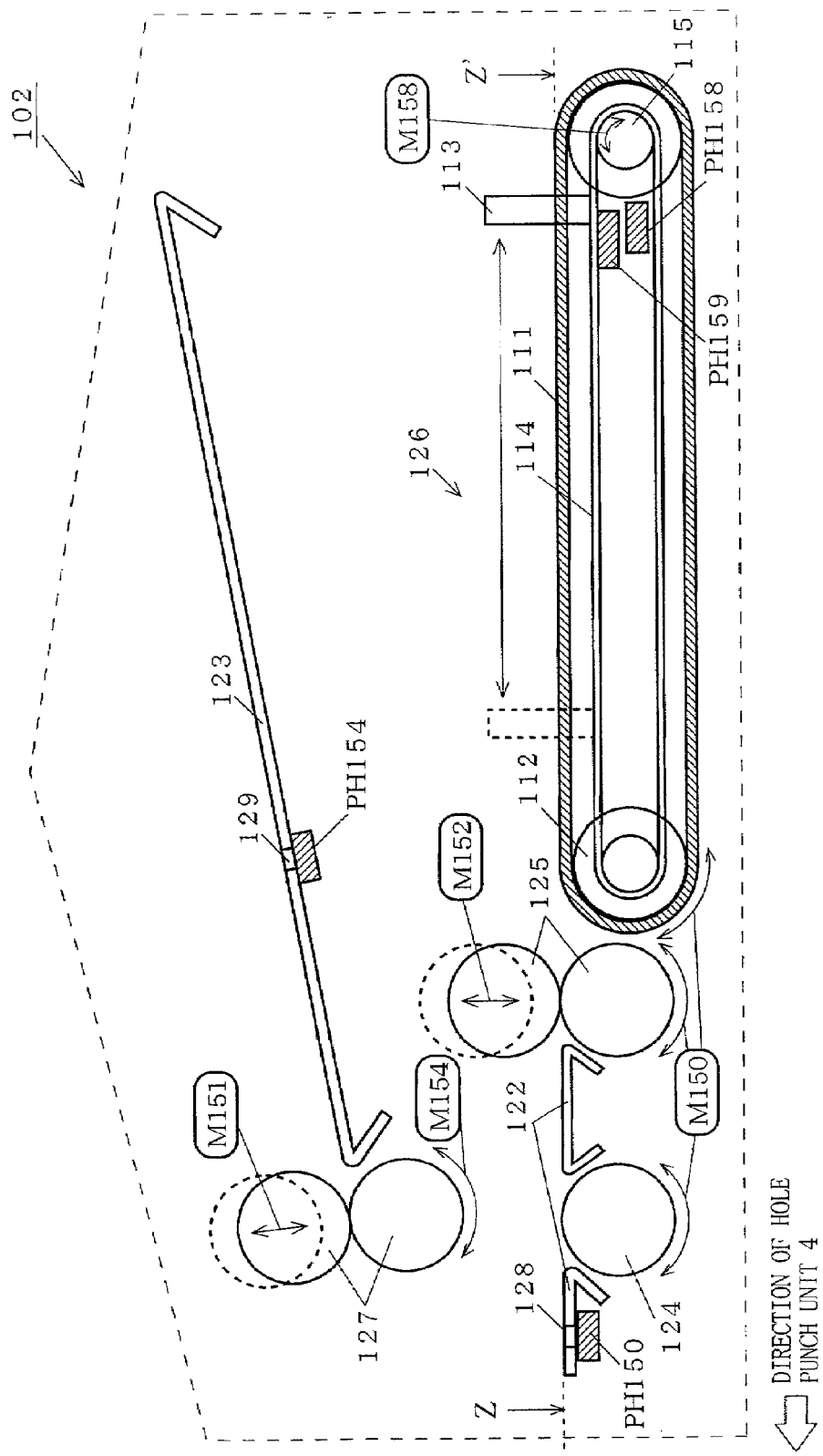
FIG. 1 is a schematic cross-sectional view, cut along a plate conveyance direction, of a conveyor mechanism 102 which is incorporated in a drum surface scanner according to a first embodiment of the present invention.

Compared with the conventional drum surface scanner described above, a drum surface scanner of the present invention is provided with a conveyor mechanism 102 for betterment of the conveyor mechanism 2. Therefore, described mainly in the below is such a new conveyor mechanism 102. In the below, any component identical to that described in the Background Art section is provided with the same reference numeral, and not described again.

First Embodiment

Figure 2:
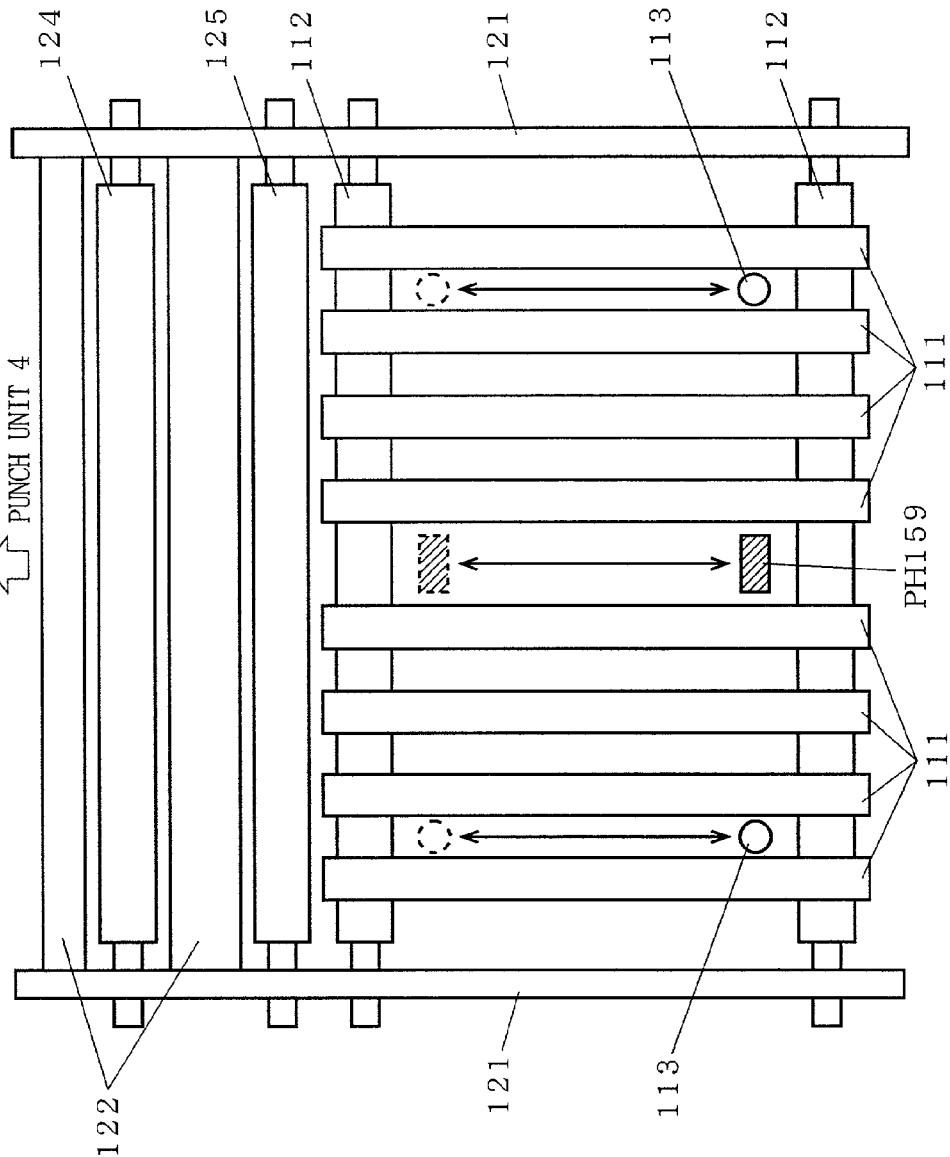
FIG. 2 is a schematic view showing the conveyor mechanism 102 of the first embodiment looked down from a line Z-Z' of FIG. 1.

FIGS. 1 and 2 are illustrations demonstrating the conveyor mechanism 102 incorporated in a drum surface scanner according to a first embodiment of the present invention. Specifically, FIG. 1 is a schematic cross-sectional view of the conveyor mechanism 102, cut along a plate conveyance direction. FIG. 2 is a schematic view as a result of looking down the conveyor mechanism 102 from a line Z-Z' of FIG. 1

In FIGS. 1 and 2, the conveyor mechanism 102 includes a lower tray 122, an upper tray 123, conveyor rollers 124 and 125 for plate loading, a conveyor roller 127 for plate unloading, and an auxiliary conveyor 126. The conveyer rollers 124, 125, and 127 are all rotatable, and held securely in position between two side panels 121 together with the lower and upper trays 122 and 123.

The lower tray 122 is an auxiliary provided for connection among the conveyer rollers 124 and 125, and the hole punch unit 4. The auxiliary conveyor 126 moves plates placed thereon in the direction of the conveyor roller 125. The conveyor roller 125 is configured by two rollers, those of which are so arranged as to abut each other at the tip of the auxiliary conveyor 126. Similarly, the conveyor roller 127 is also configured by two rollers, those of which are so arranged as to abut each other at the tip of the upper tray 123. The conveyor rollers 124 and 125 are coupled, through a gear or a belt (not shown), with a motor M150 which is securely fixed to the side panel(s) 121. The motor M150 drives both the conveyor rollers 124 and 125 into rotation. Here, the upper roller of the conveyor roller 125 can move up and down responding to the driving power coming from a motor M152, thereby securely holding the plate with the lower roller with appropriate strength. The conveyor roller 127 is coupled, through a gear or a belt (not shown), with a motor M154 which is securely fixed to the side panel(s) 121. The motor M154 drives the conveyor roller 127 into rotation. The upper roller of the conveyor roller 127 can move up and down responding to the driving power coming from a motor M151, thereby securely holding the plate with the lower roller with appropriate strength.

The lower and upper trays 122 and 123 are provided, respectively, with small holes 128 and 129, and directly therebelow, sensors PH150 and PH154 are each affixed. These sensors PH150 and PH154 are used to detect whether there is any plate placed directly above the small holes 128 and 129, respectively.

The auxiliary conveyor 126 is structured by a plurality of conveyor belts 111, a pair of rollers 112 for belt feeding, two movable pins 113, a belt 114 for driving the movable pins, a pair of pulleys (or rollers) 115 for feeding the movable pins, a motor M158, and sensors PH158 and PH159.

A plurality of conveyor belts 111 are placed around the pair of rollers 112 so as not to interfere with one another. In FIG. 2 example, eight conveyor belts 111 are shown. One of the rollers 112 is coupled with the motor M150 by a gear or a belt (not shown), and driven thereby into rotation. Because the motor M150 drives also the conveyor rollers 124 and 125 as already described, the conveyor rollers 124 and 125, and the conveyor belts 111 all rotate at the same speed. The two movable pins 113 are securely affixed to the belt 114 so as to protrude from between the conveyor belts 111 in the direction perpendicular to the plate conveyance direction. The two movable pins 113 are so arranged as to be parallel to each other, and be symmetrical with respect to the center line of the plate P in the plate conveyance direction. The space between those two movable pins 113 will be narrower than the space between the two punchers 41 in the hole punch unit 4. This structure enables the movable pins 113 to insert the plate P without fail, when pushing the tail end thereof, into the gap 45 of the corresponding puncher 41. The belt 114 for driving the movable pins is placed around the pair of pulleys (or rollers) 115 for pin feeding. One of the pulleys (or rollers) 115 is coupled with the motor M158 by a belt (not shown), and driven thereby into rotation. With such a structure, responding to the driving power of the motor M158, the two movable pins 113 move on the auxiliary conveyor 126 in the direction opposite to the plate conveyance direction.

The belt 114 is affixed with a sensor PH159 at a predetermined position to detect, through the spaces between the conveyor belts 111, whether there is any plate. The sensor PH159 thus moves on the auxiliary conveyor 126, together with the movable pins 113, in the direction opposite to the plate conveyance direction responding to the driving power of the motor M158. Another sensor PH158 is affixed to a predetermined position of the auxiliary conveyor 126, and detects whether or not the movable pins 113 are located at their own predetermined positions, i.e., original positions.

Referring to FIGS. 3 to 16, described in detail next are a sequence of processes executed by the components described above for plate conveyance, and a method for checking the plate length Y.

Figure 3:
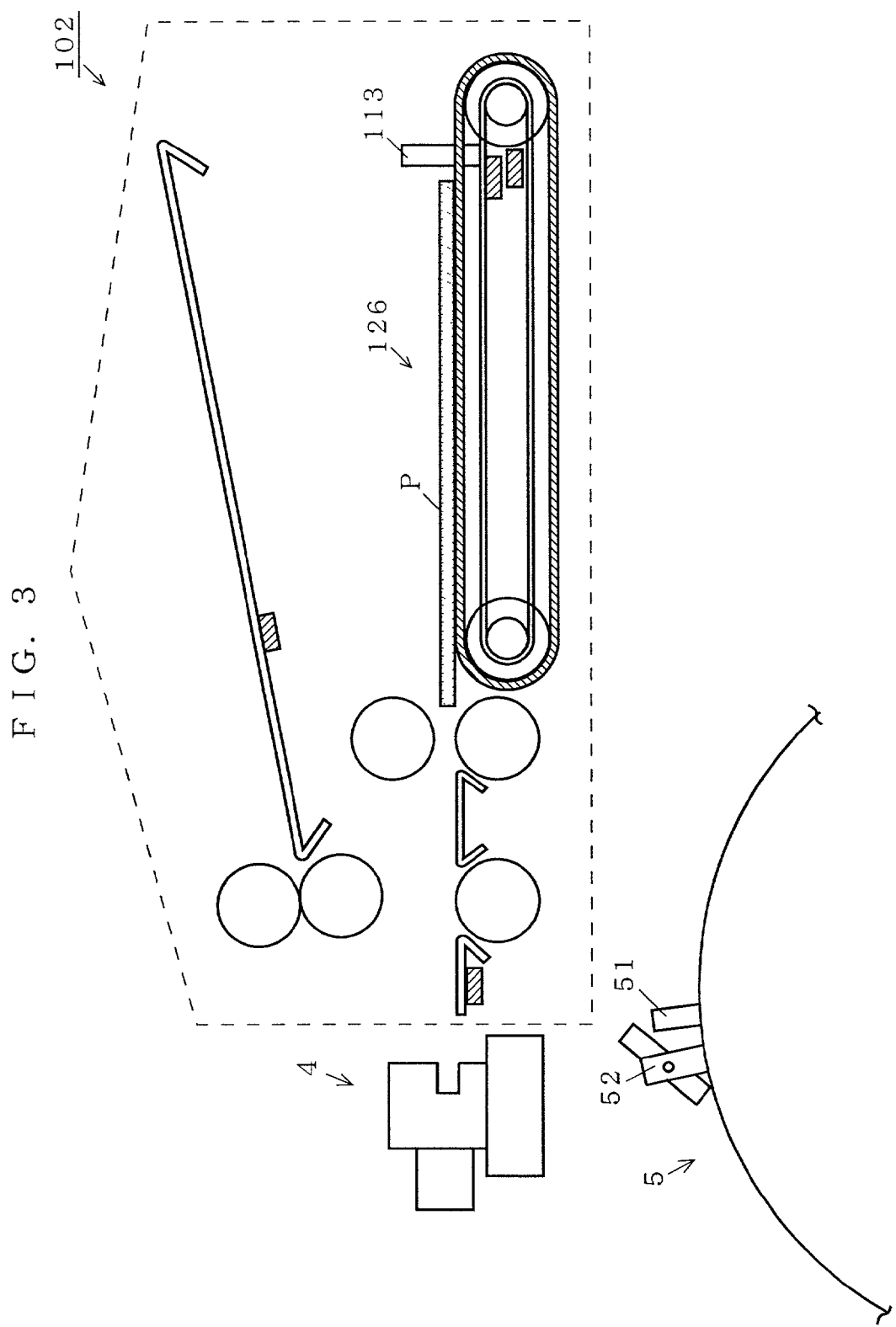
FIGS. 3 to 15 are illustrations demonstrating how a plate P is conveyed by the conveyor mechanism 102.
Figure 4:
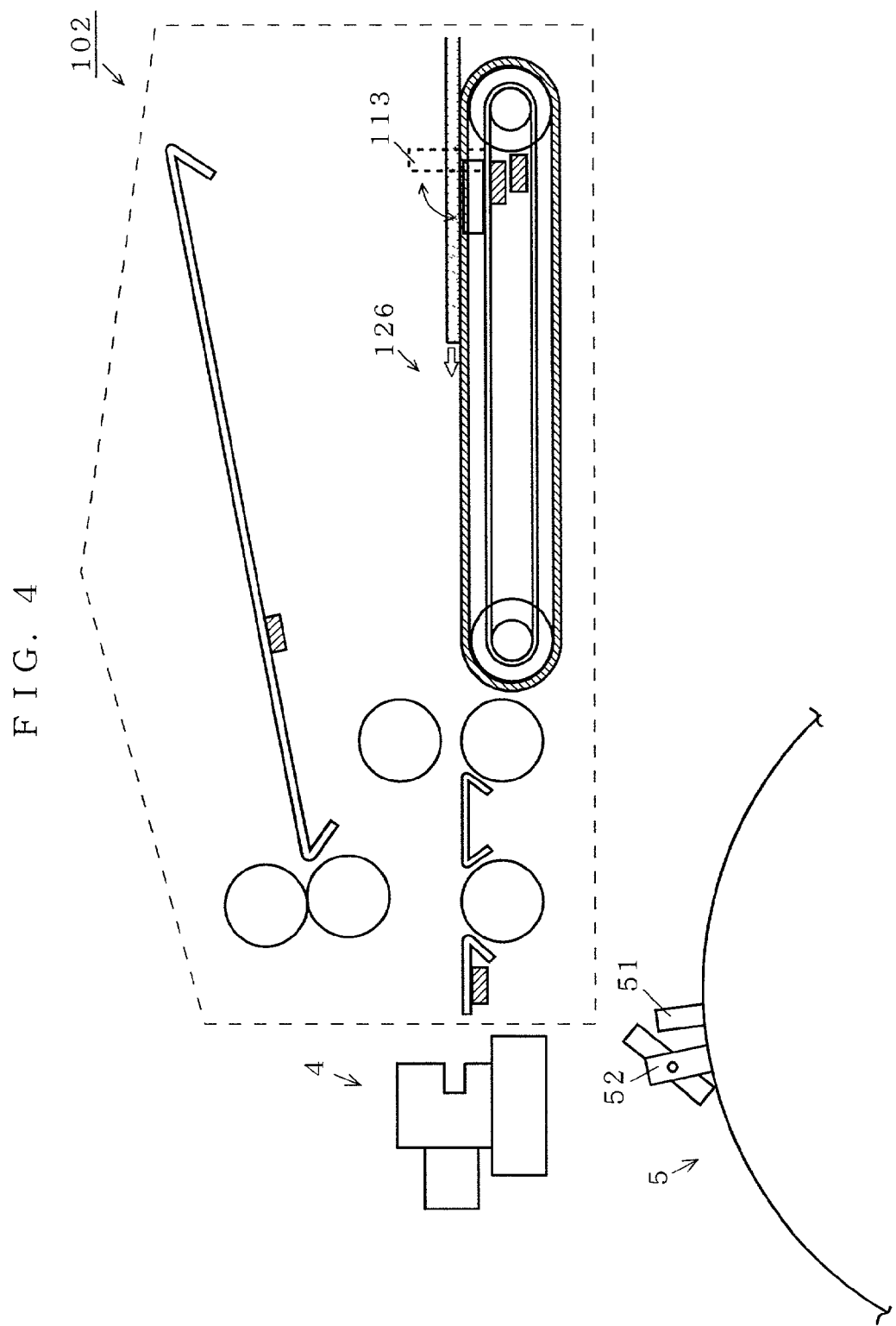

The movable pins 113 in their initial states are at their original positions, i.e., be farthest from the hole punch unit 4 side, as shown in FIG. 3. The plate P is provided in the direction of the hole punch unit 4 viewed from the direction of the movable pins 113. In the below, such a direction is referred to as a positive direction. This plate supply is done manually by operators, or automatically by an automatic plate supply mechanism (not shown) additionally provided to the present drum surface scanner. Here, in a case where the plate P comes from behind the movable pins 113 (right hand side in FIG. 3), the movable pins 113 may be made to fall to the upper surfaces of the conveyor belts 111 in the positive direction to be located therebelow (see FIG. 4). If this is the case, it will be more preferable if a guide or others are provided to automatically fell the pins at their original positions to a degree to be lower than the upper surfaces of the conveyor belts 111.

Figure 5:
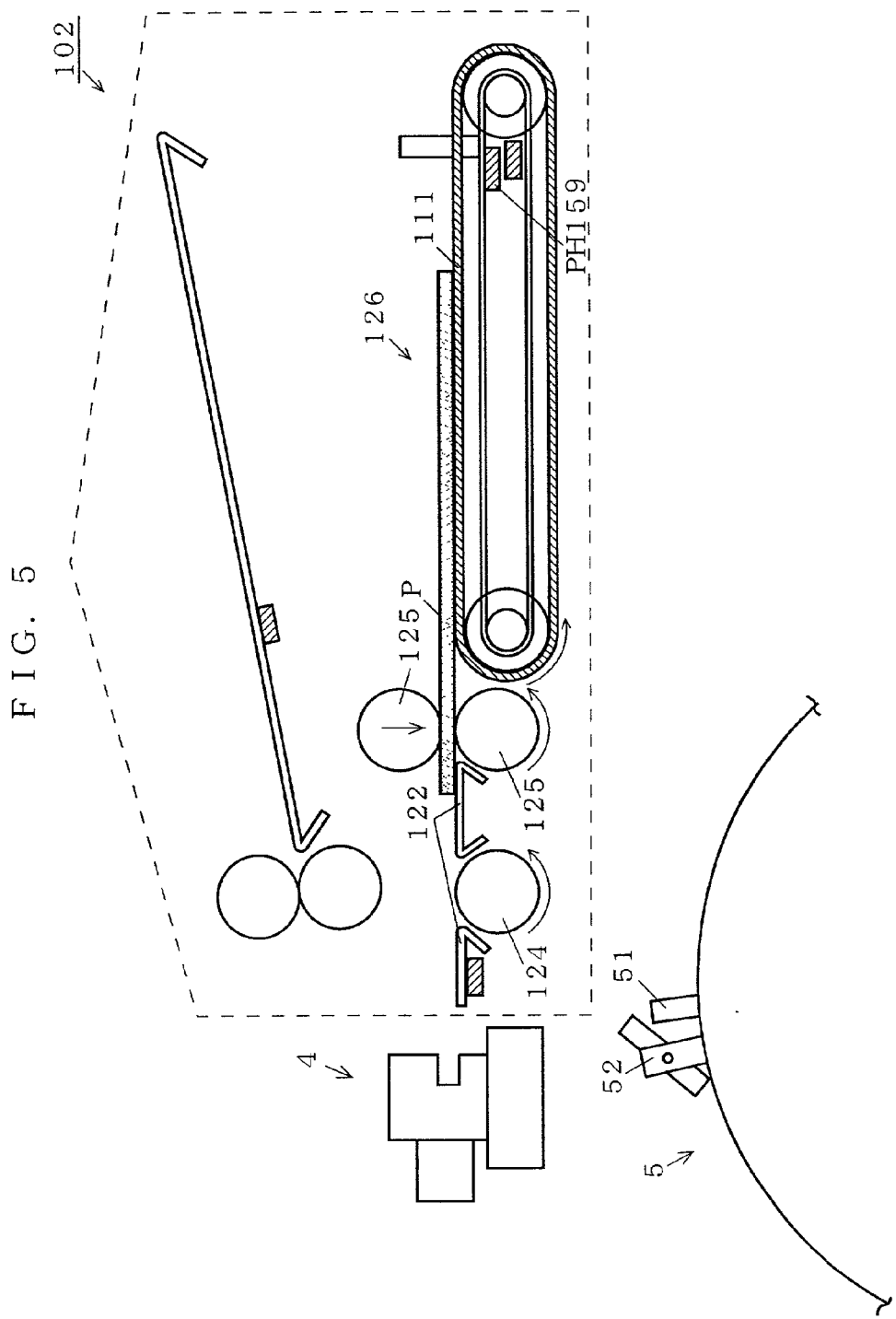
Figure 6:
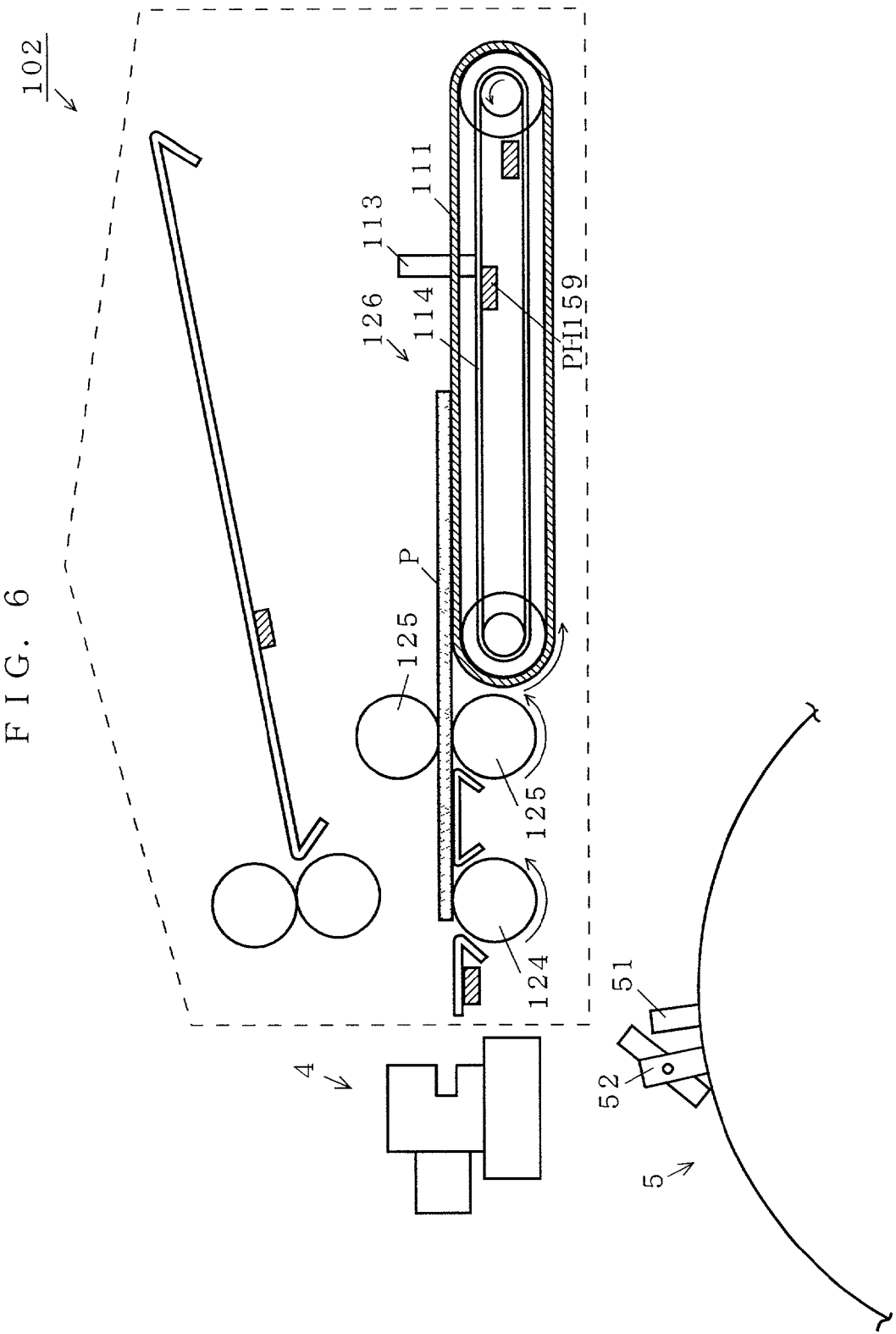

When the sensor PH159 of the auxiliary conveyor 126 detects that the plate P has been supplied, the upper roller of the conveyor roller 125 moves down, and the conveyor rollers 124 and 125, and the conveyor belts 111 start rotating in such a direction as to convey the plate P in the positive direction (see FIG. 5). With such a rotation, the plate P is conveyed over the lower tray 122, and forwarded to the hole punch unit 4. If the plate P moves out of the range covered by the sensor PH159, the belt 114 for driving the movable pins starts rotating in the positive direction at the same speed with the conveyor belts 111 so that the movable pins 113 follow the tail end of the plate P at a given distance therefrom (see FIG. 6).

Figure 7:
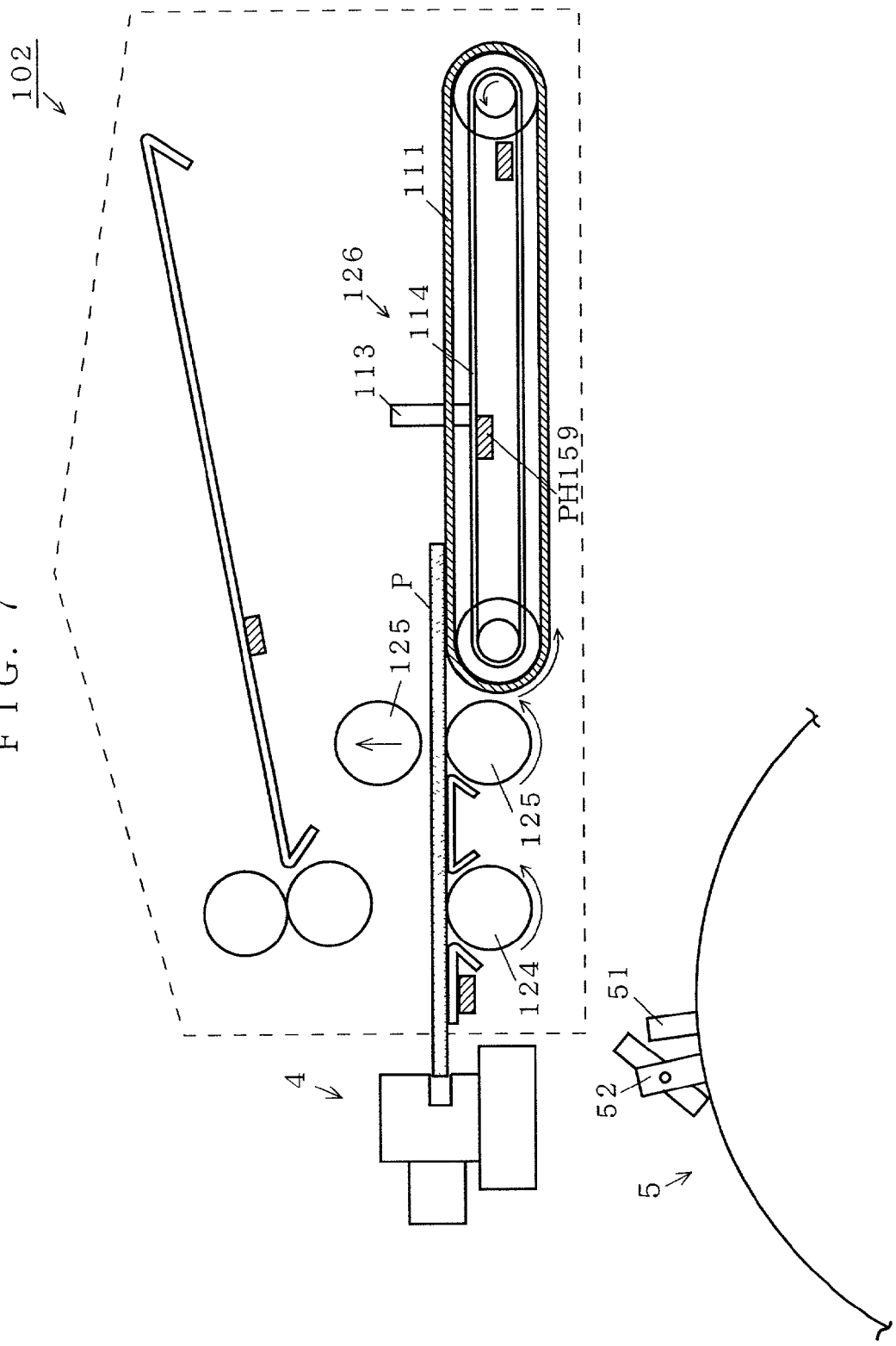
Figure 8:
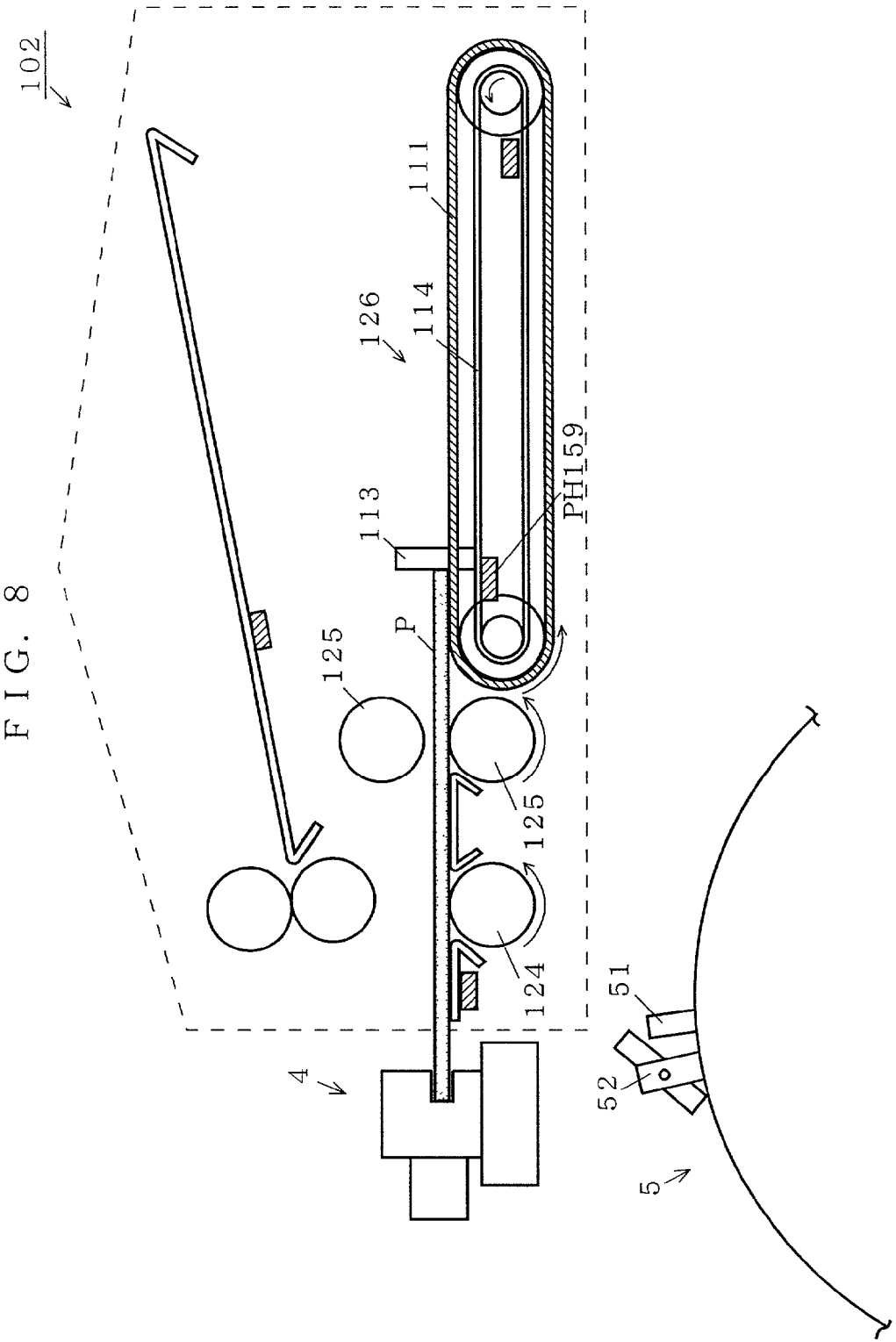

When the plate P comes to a predetermined position immediately in front of the hole punch unit 4, the upper roller of the conveyor roller 125 moves up (see FIG. 7). Thereafter, used are the conveyor roller 124, the lower roller of the conveyor roller 125, and the conveyor belts 111 to convey the plate P until the front end thereof reaches the hole punch unit 4. When the front end of the plate P reaches the hole punch unit 4, the movable pins 113 which are moving as if chasing the plate P push the tail end of the plate P to completely insert the front end thereof into the hole punch unit 4 (see FIGS. 8 and 16). With such movements of the movable pins 113, the plate P can be positioned with accuracy in the process of forming punched holes and/or cuts.

Simultaneously with the plate insertion, the conveyor mechanism 102 defines the plate P by length Y based on the movement amount of the movable pins 113, i.e., from their original positions to the current positions pushing the tail end of the plate P. In other words, the movement amount will be equal to the length from their original positions to positions at where the sensor PH159 detects the tail end of the plate P. For example, when the movable pins 113 are originally located at a position of 1000 mm, and when the movement amount of the movable pins 113 is 250 mm, the length Y of the plate P can be determined as being 750 mm.

This is surely not restrictive, and the rotation amount of the pair of rollers 112 may be used for the purpose.

If the conveyor mechanism 102 determines that the plate P is correct in length Y, the hole punch unit 4 then applies the punching process to the plate P which has been correctly adjusted in position. If the plate P is determined as wrong in length Y, the operation immediately stops, and operators and others receive a message showing or telling that a mistake has occurred to plate supply.

Figure 9:
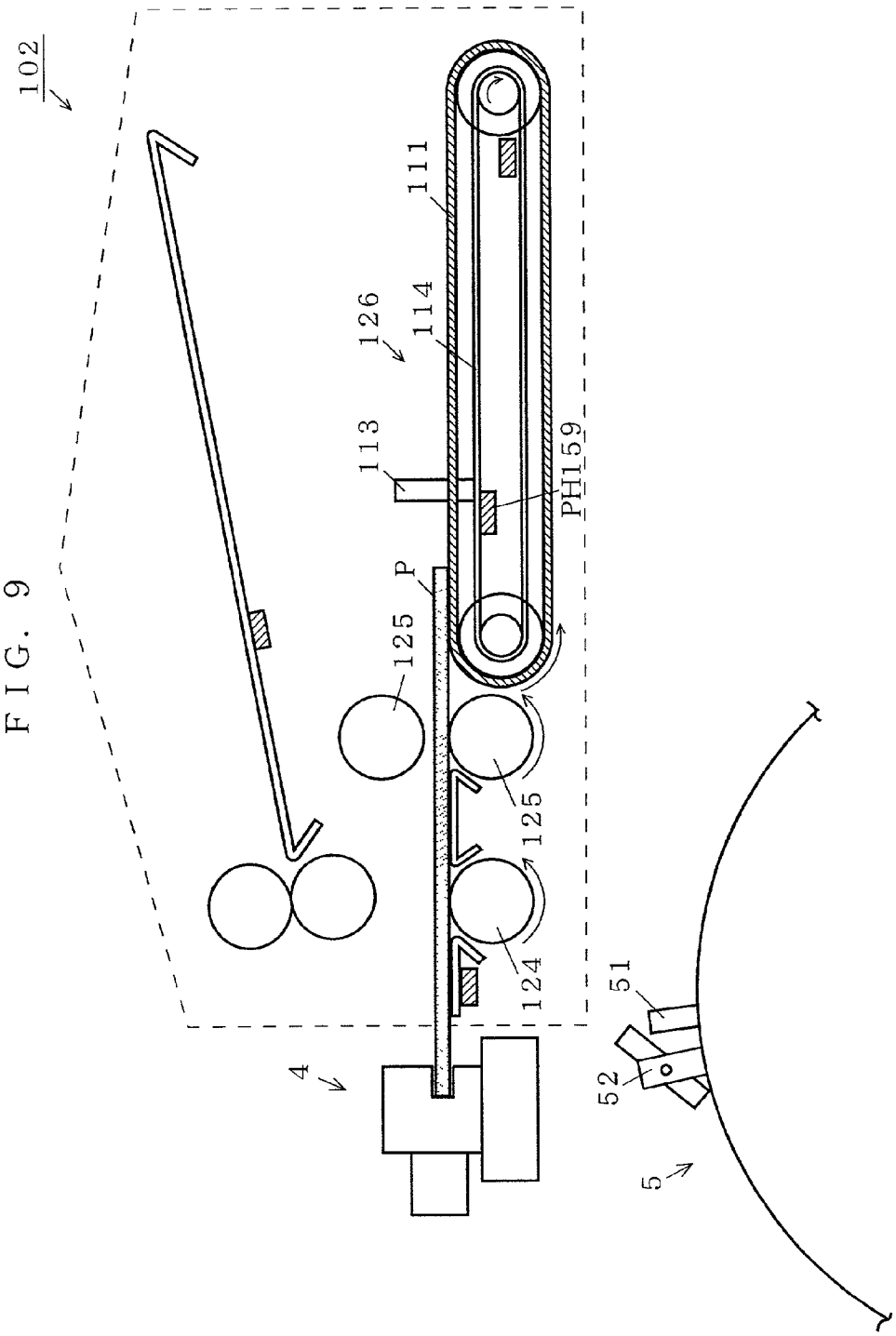
Figure 10:
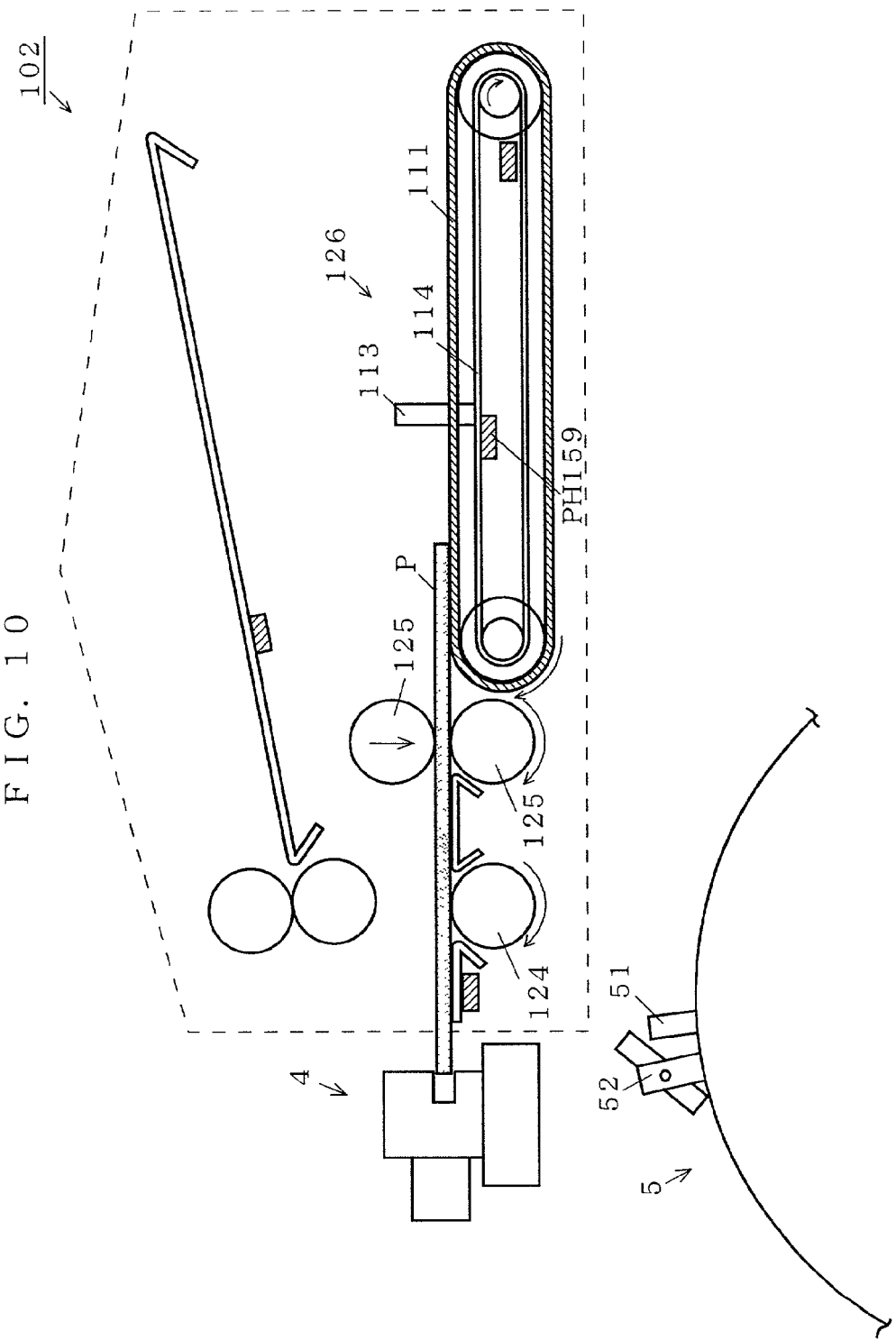

After the plate P is accurately punched in by the hole punch unit 4, the movable pins 113 move in the direction away from the hole punch unit 4 (see FIG. 9). In the below, such a direction is referred to as an opposite direction. Once the movable pins 113 have moved a given distance away from the tail end of the plate P, the upper roller of the conveyor roller 125 moves down. Simultaneously therewith, the conveyor rollers 124 and 125, and the conveyor belts 111 all start rotating to convey the plate P in the opposite direction (see FIG. 10). As a result, the punched plate P is conveyed back onto the lower tray 122.

Figure 11:
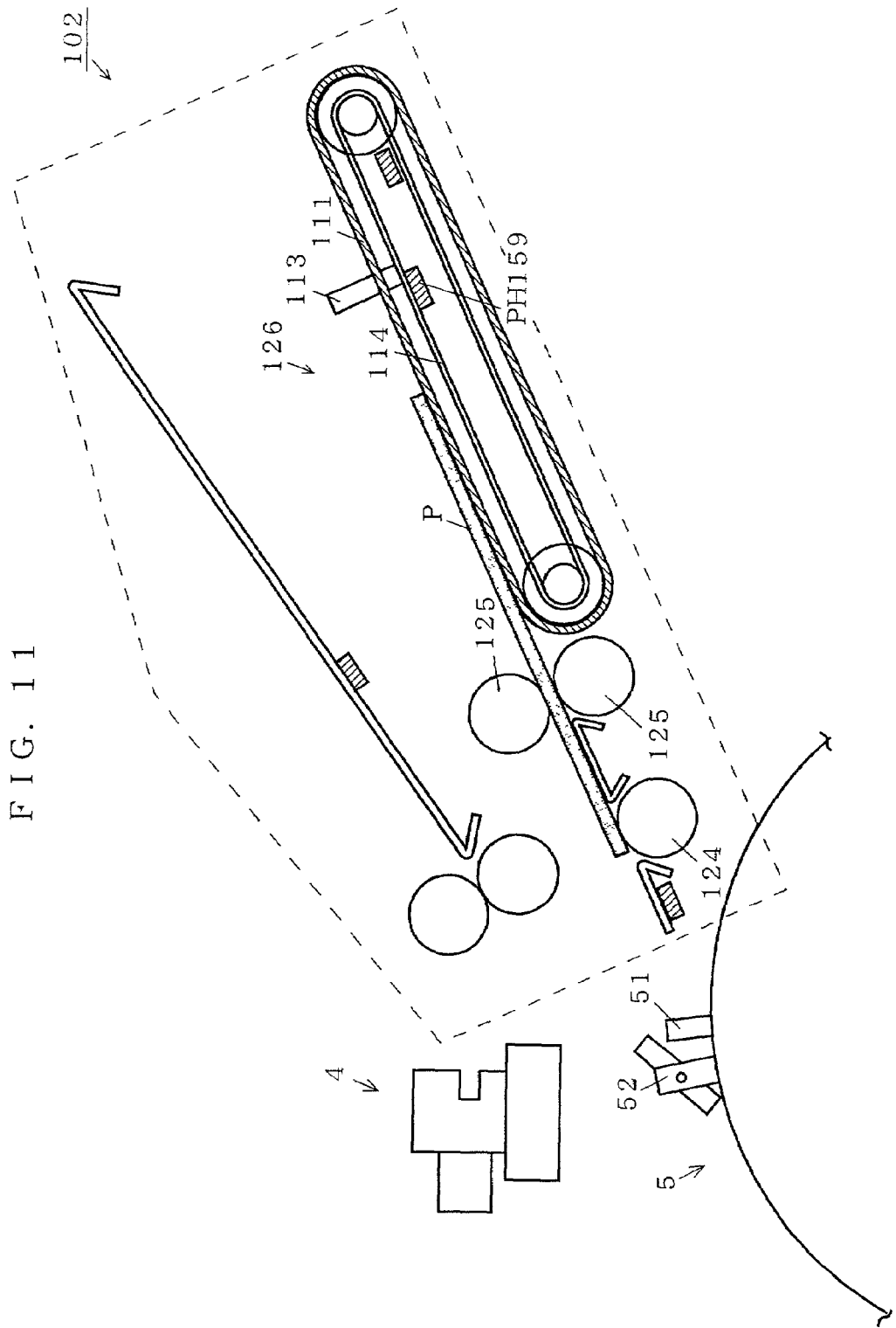
Figure 12:
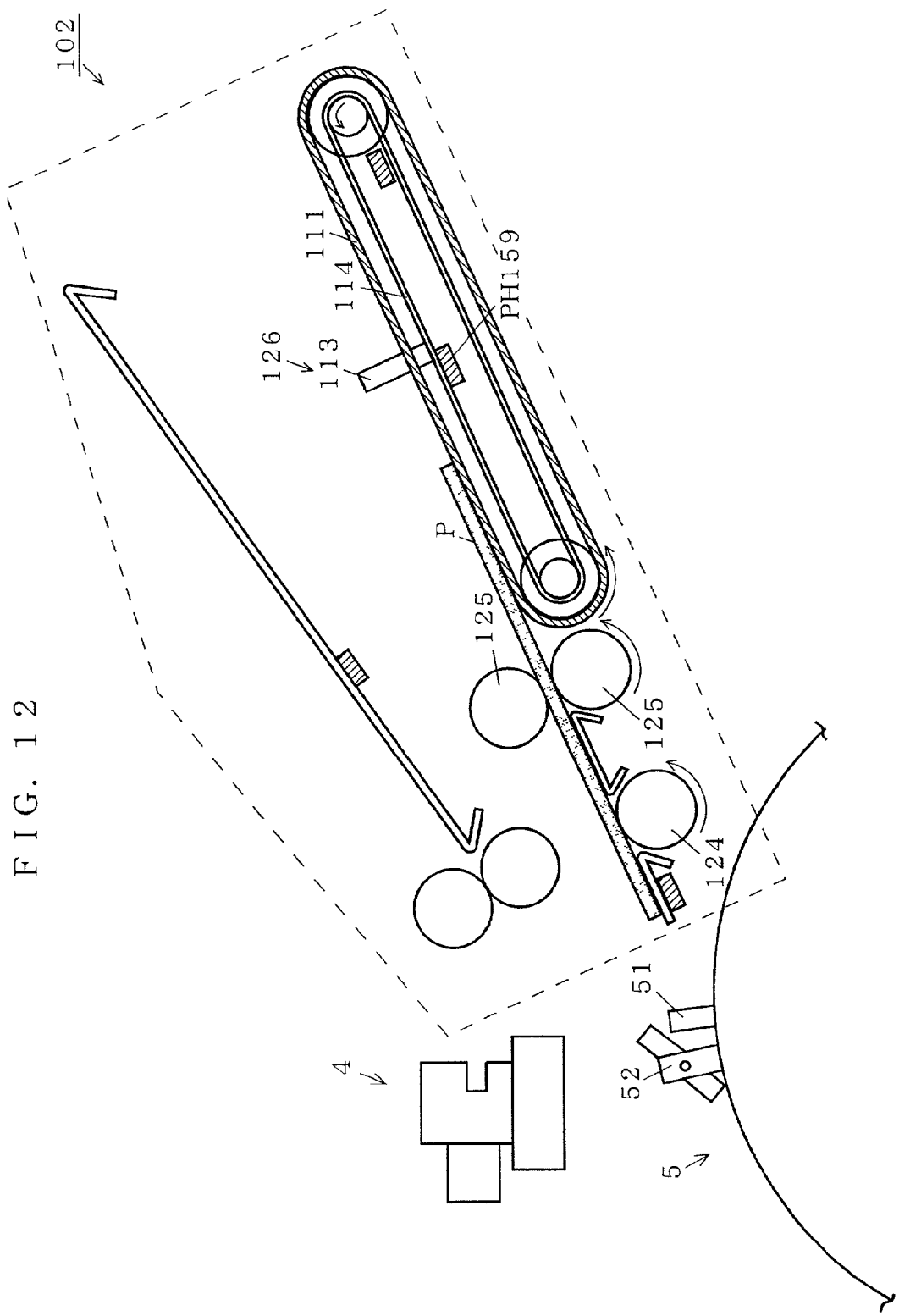
Figure 13:
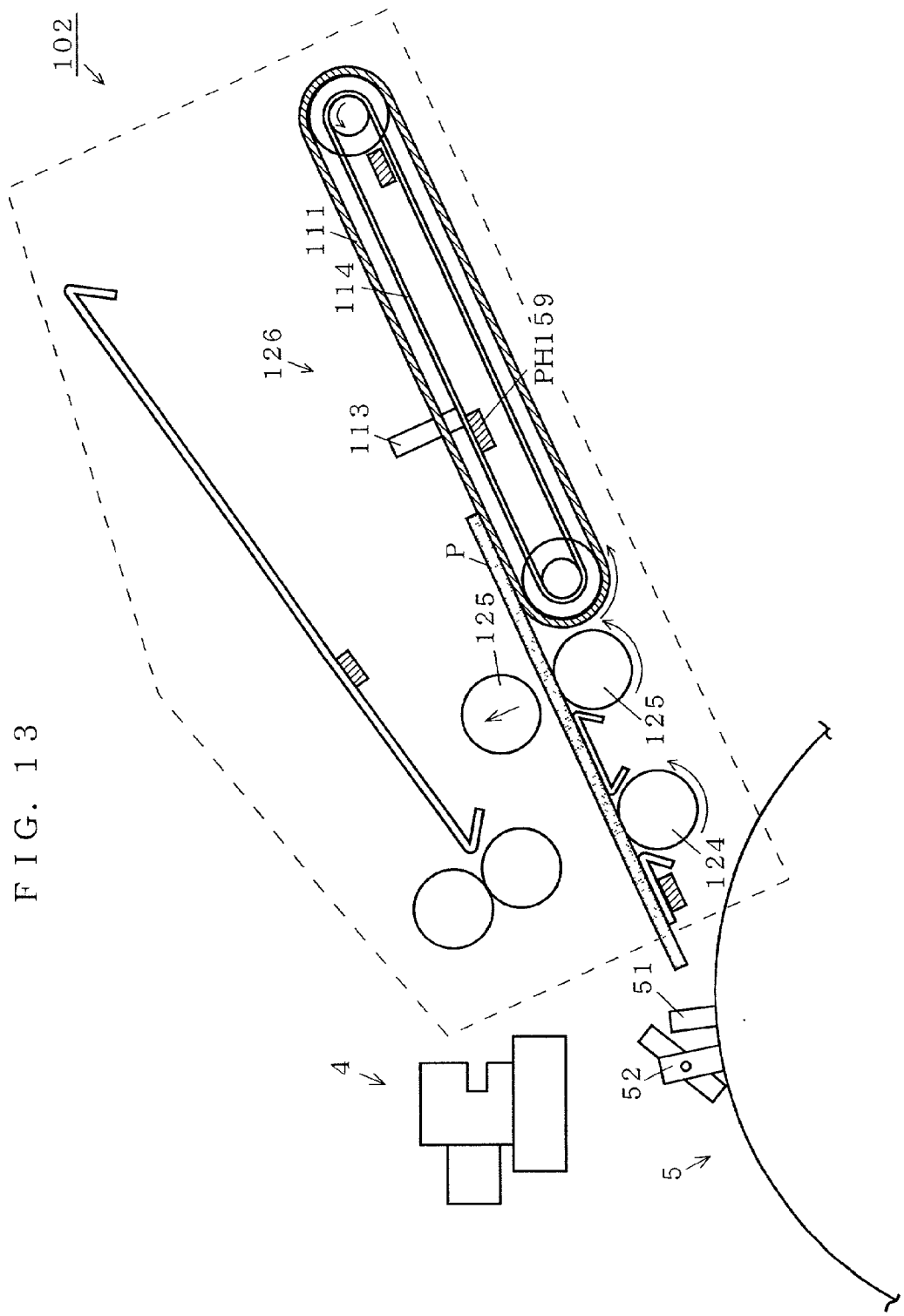
Figure 14:
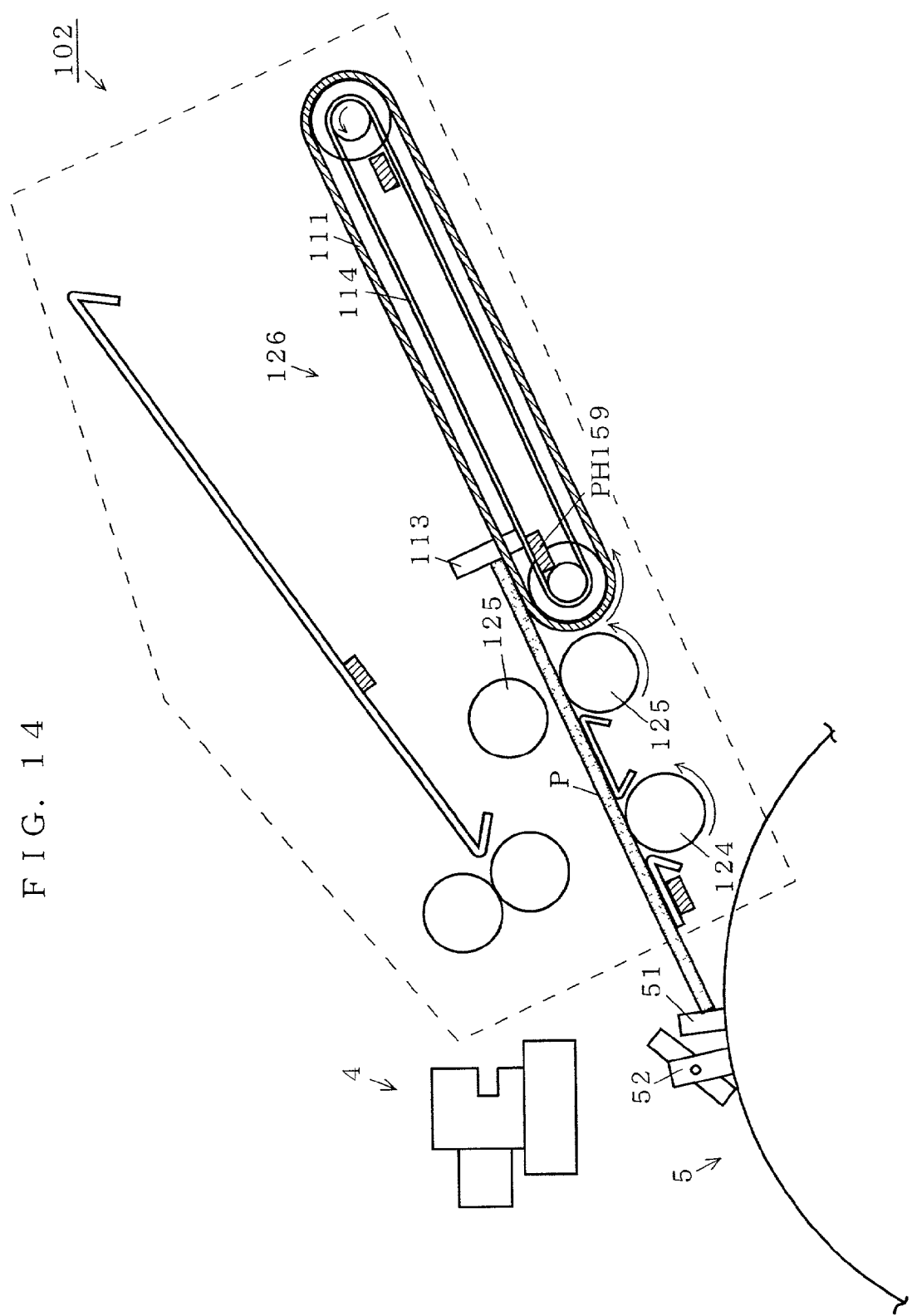

Once the plate P has conveyed back as such, the conveyor mechanism 102 moves the lower tray 122 to its lower position to have it face to the recording drum 5, i.e., to have the line extended straight from the lower tray 122 abut the outer surface of the recording drum 5 (see FIG. 11). Next, the conveyor rollers 124 and 125, and the conveyor belts 111 all rotate in the positive direction so that the punched plate P is forwarded from the lower tray 122 to the recording drum 5 (see FIG. 12). When the plate P comes to a predetermined position, which is immediately in front of the positioning pins 51, the upper roller of the conveyor roller 125 moves up (see FIG. 13). Thereafter, used are only the conveyor roller 124, the lower roller of the conveyor roller 125, and the conveyor belts 111 to convey the plate P until the front end thereof reaches the positioning pins 51. Once the front end of the plate P has reached the positioning pins 51, the movable pins 113 locating away therefrom push the tail end of the plate P so that the front end of the plate P abuts the positioning pins 51 (see FIG. 14). By the movable pins 113 moving as such, the plate P can be positioned on the recording drum 5 with accuracy in the exposure process.

Figure 15:
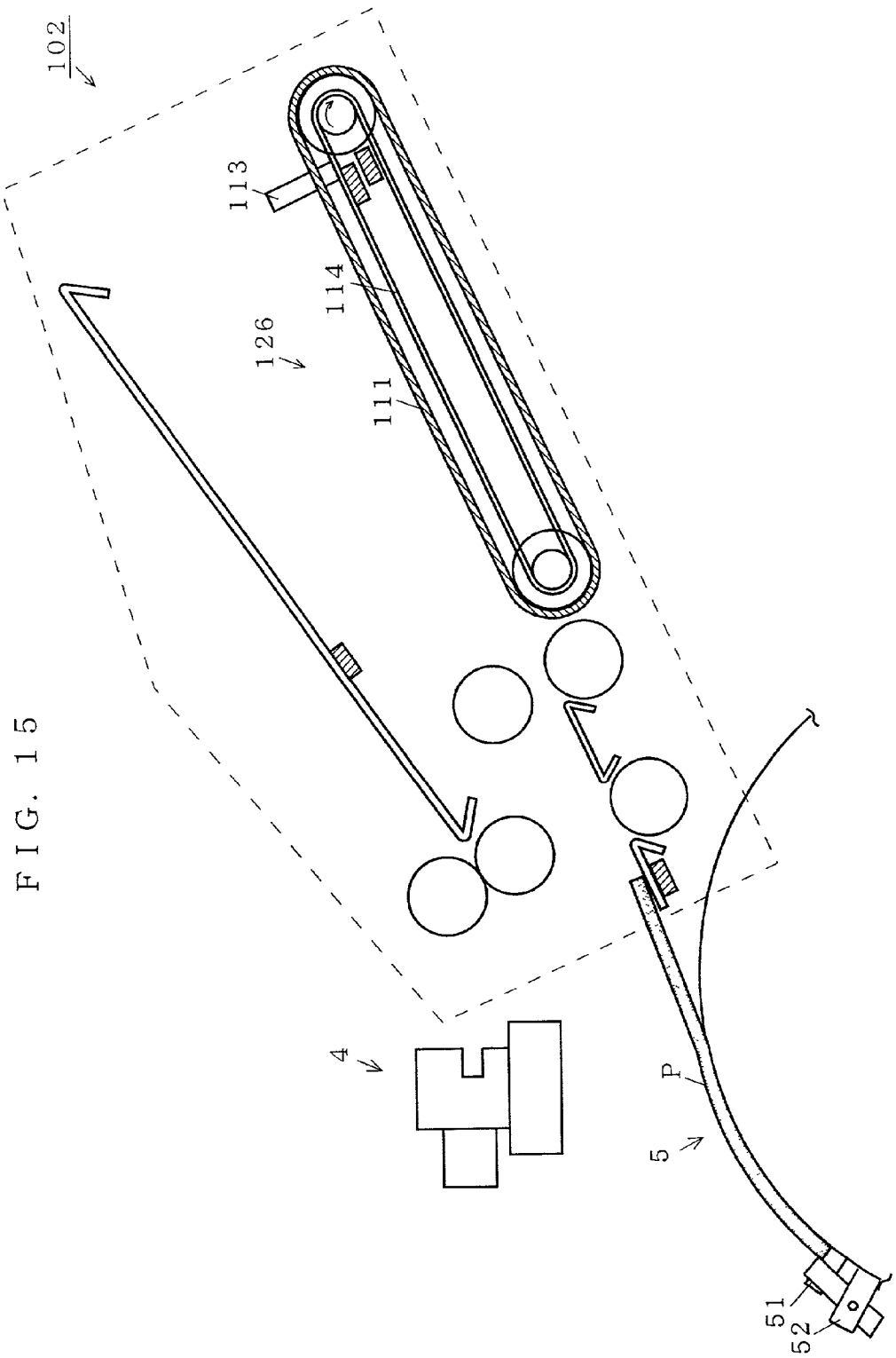
Figure 16:
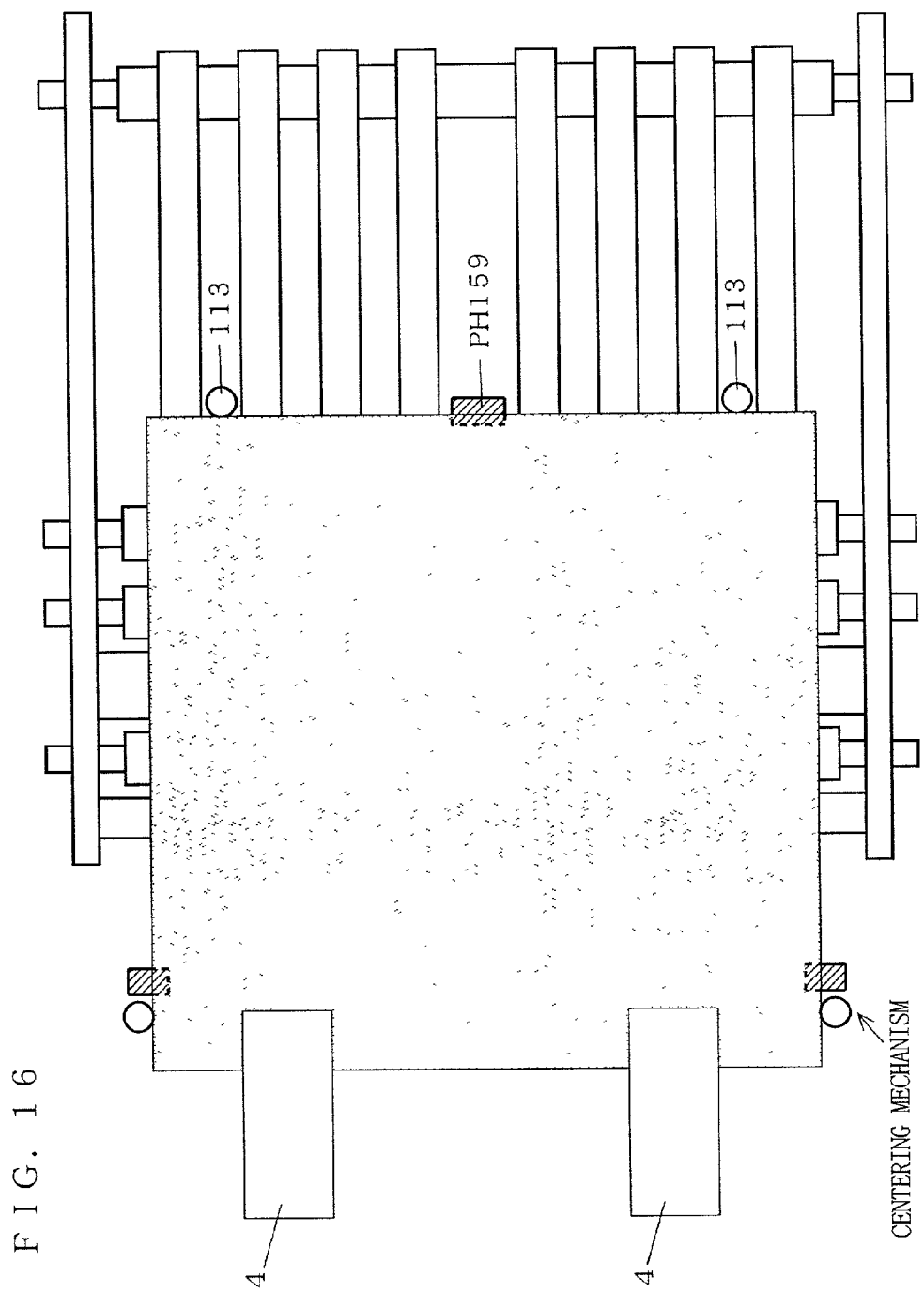
FIG. 16 is a schematic view as a result of looking down the conveyor mechanism 102 in such a state as shown in FIG. 8.

After the plate P is conveyed to the recording drum 5, the movable pins 113 move in the opposite direction to return to their original positions (see FIG. 15).

Here, the plate P after the exposure process is unloaded in a similar manner to the above.

As such, with the conveyor mechanism 102 incorporated in the drum surface scanner of the first embodiment, the movable pins 113 push the tail end of the plate P so that the plate P can be accurately positioned prior to the process for forming punched holes and/or cuts therein. Further, with the plate check method employed by the drum surface scanner, the plate P can be checked for its length Y. Accordingly, the plate can be formed with punched holes and/or cuts after accurate position adjustment, and then clamped to the recording drum. Moreover, the plate P can be checked for its length Y before the punching process applied thereto by the hole punch unit 4, preventing a waste even if plate supply has been wrong in size, i.e., length Y.

It should be noted here that the movable pins 113 are not restricted to cylindrical shape as exemplified in the present embodiment, and any other shapes are surely applicable, i.e., prismatic shape, conical shape.

Second Embodiment

In the conventional drum surface scanner, the plate loading mechanism and the plate unloading mechanism are provided separately in the conveyor mechanism 2. Such a structure causes the recording drum 5 to be positioned differently to have plate loaded and unloaded. As a result, the conventional drum surface scanner needs to rotate the recording drum 5 for position adjustment prior to plate loading, resulting in a low throughput in the exposure process.

In a second embodiment, described is a conveyor mechanism in which a plate loading mechanism and a plate unloading mechanism are partly used together for better throughput in the exposure process.

Figure 17:
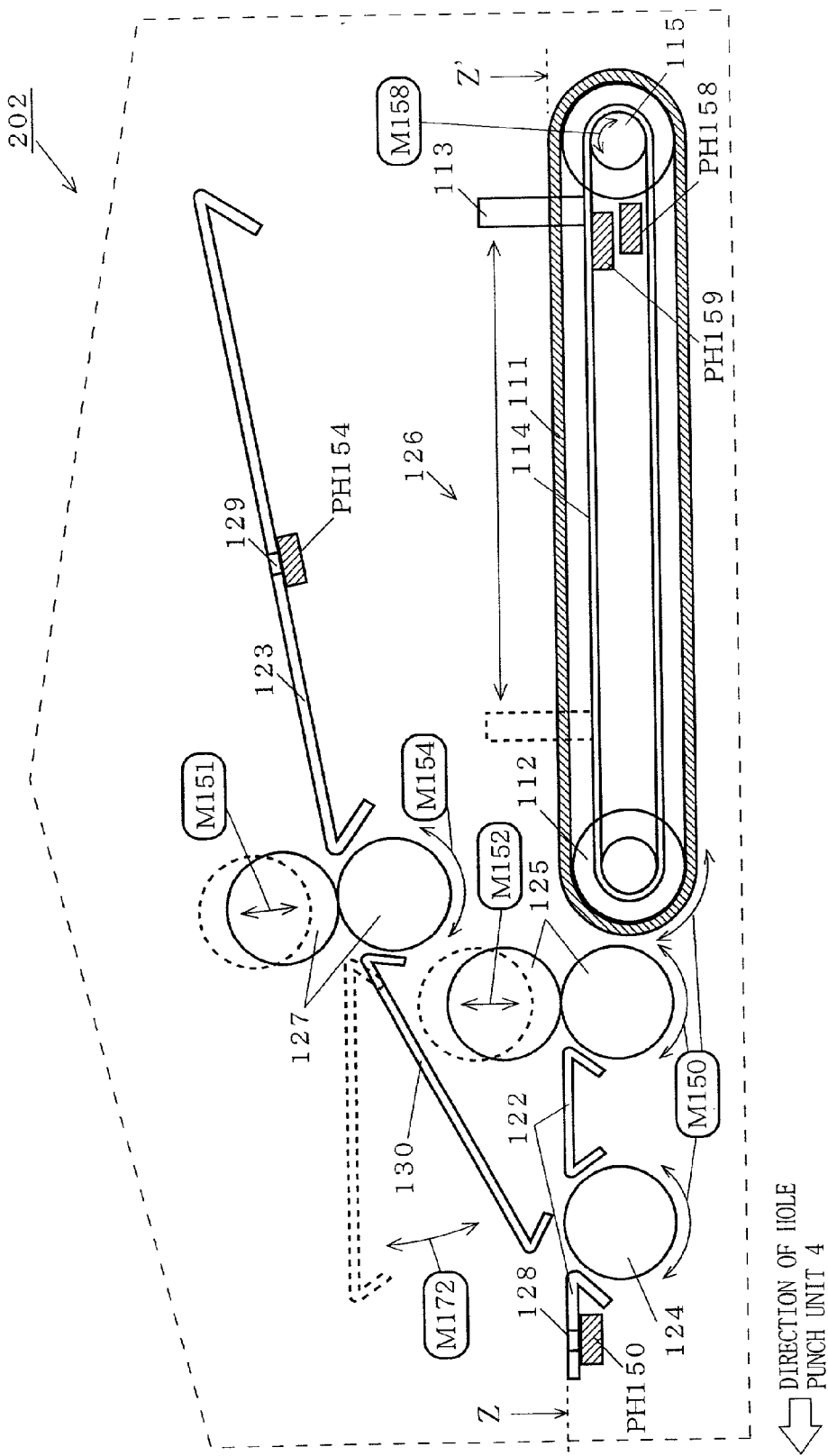
FIG. 17 is a schematic cross-sectional view, cut along a plate conveyance direction, of a conveyor mechanism 202 which is incorporated in a drum surface scanner according to a second embodiment of the present invention.

FIG. 17 is a schematic cross-sectional view, cut along a plate conveyance direction, of a conveyor mechanism 202 incorporated in the drum surface scanner of the second embodiment. As shown in FIG. 17, the conveyor mechanism 202 of the second embodiment further includes a pass switching movable guide 130 and a motor M172 compared with the conveyor mechanism 102 of the first embodiment. Herein, any components identical to those found in FIG. 1 are provided with the same reference numerals, and not described again.

The conveyor roller 127 are configured by two rollers, and those of which are so arranged as to abut each other at both tips of the lower tray 123 and the pass switching movable guide 130. Here, the pass switching movable guide 130 can move up and down by the driving power coming from the motor M172.

Figure 18:
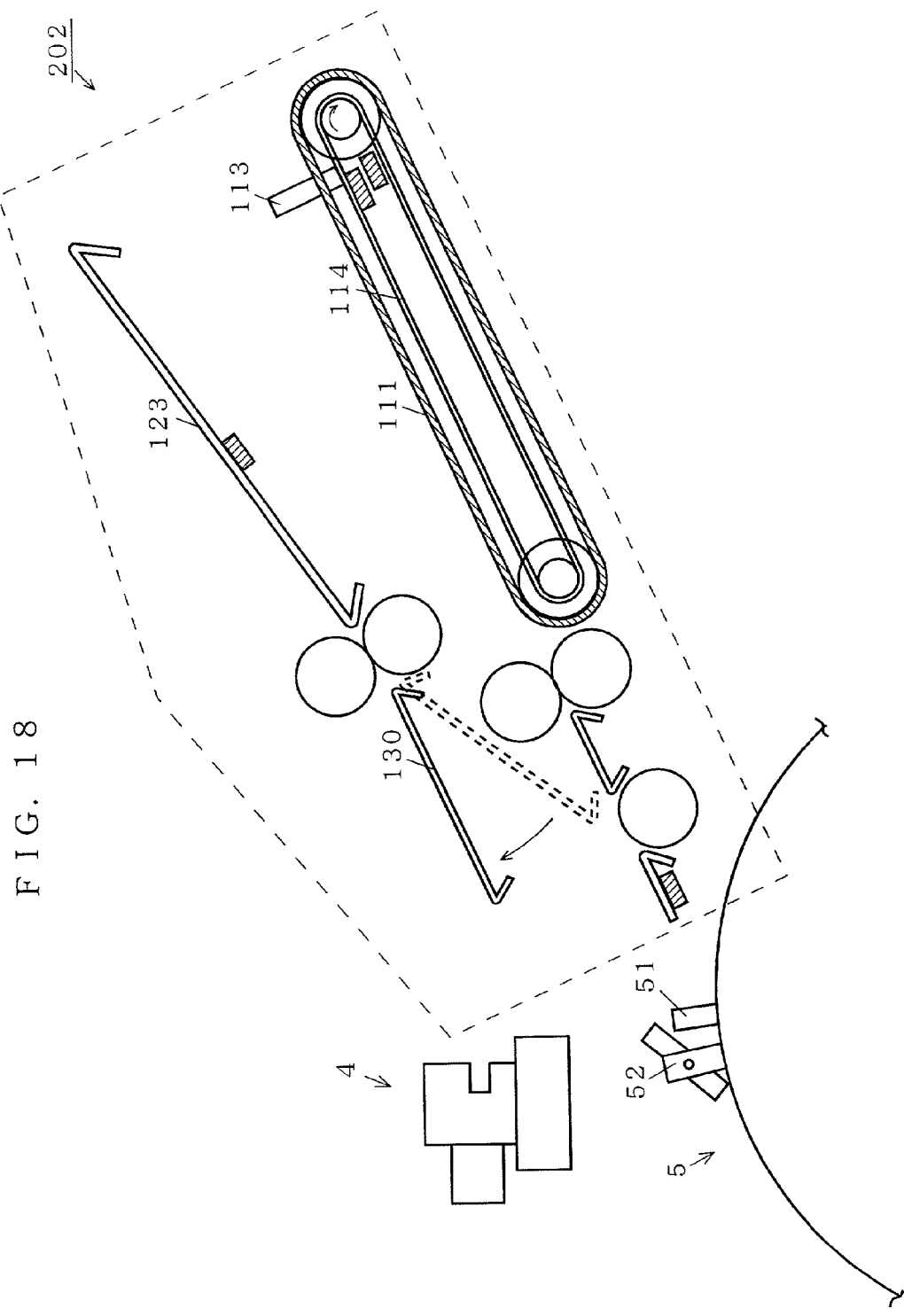
FIGS. 18 and 19 are illustrations demonstrating how a plate P is conveyed by the conveyor mechanism 202.
Figure 19:
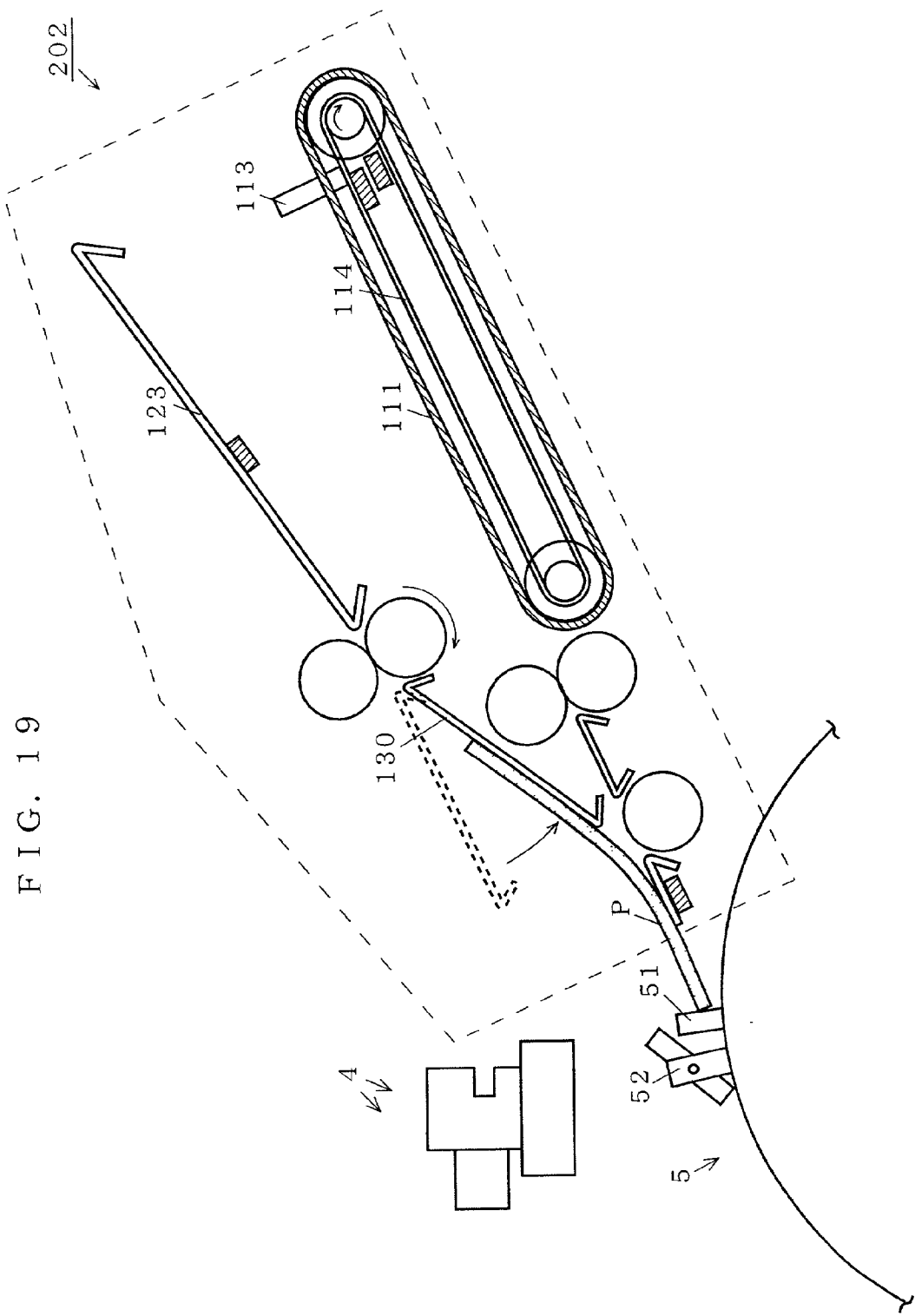
Figure 20:
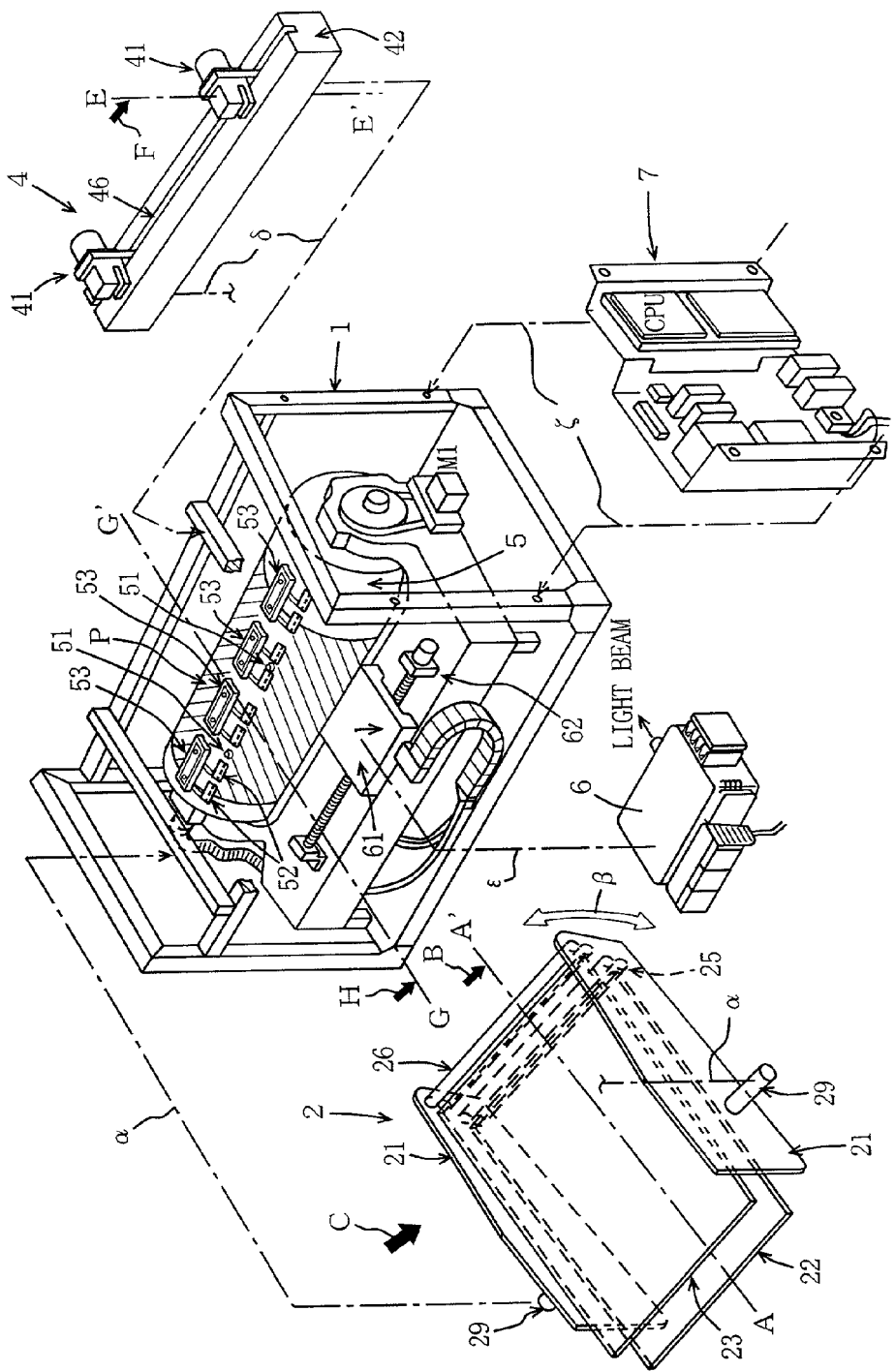
FIG. 20 is an exploded view showing the structure of a conventional drum surface scanner.
Figure 21:
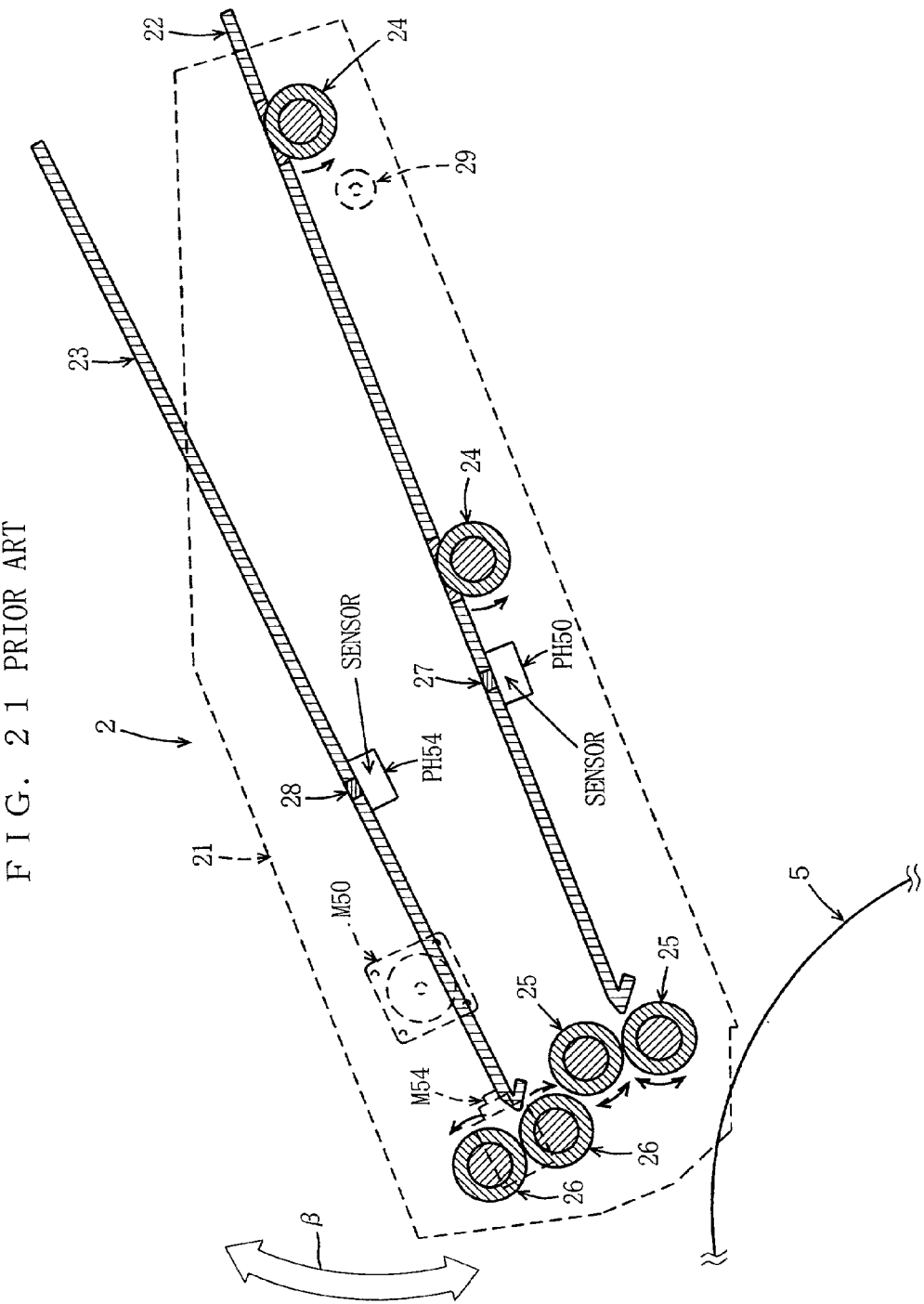
FIG. 21 is a cross-sectional view of a conveyor mechanism 2, cut along a line A-A' and viewed from the direction of an arrow B of FIG. 20.
Figure 22:
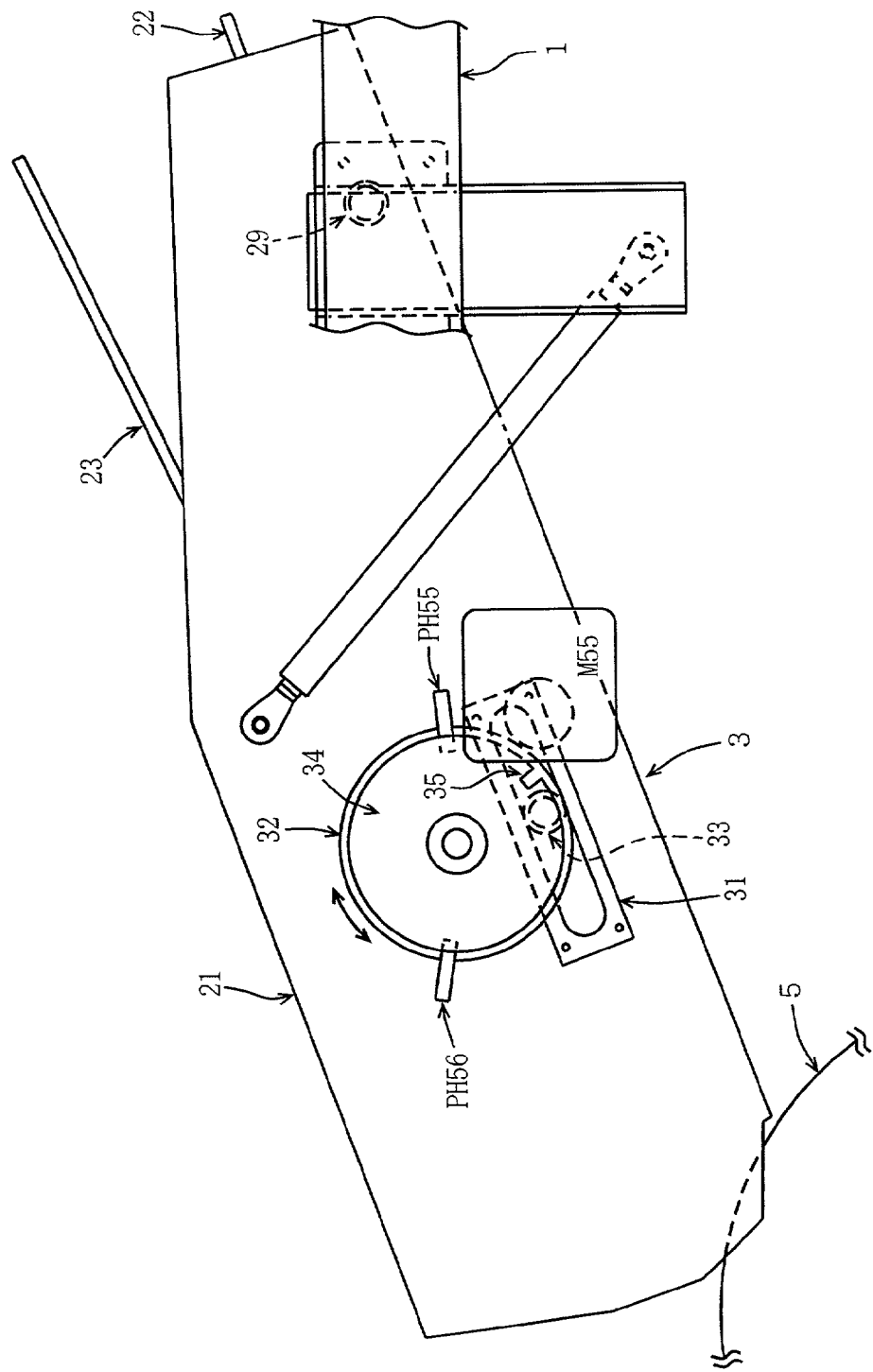
FIG. 22 is an illustration showing a drive mechanism 3 viewed from the direction of an arrow C of FIG. 20.
Figure 23:
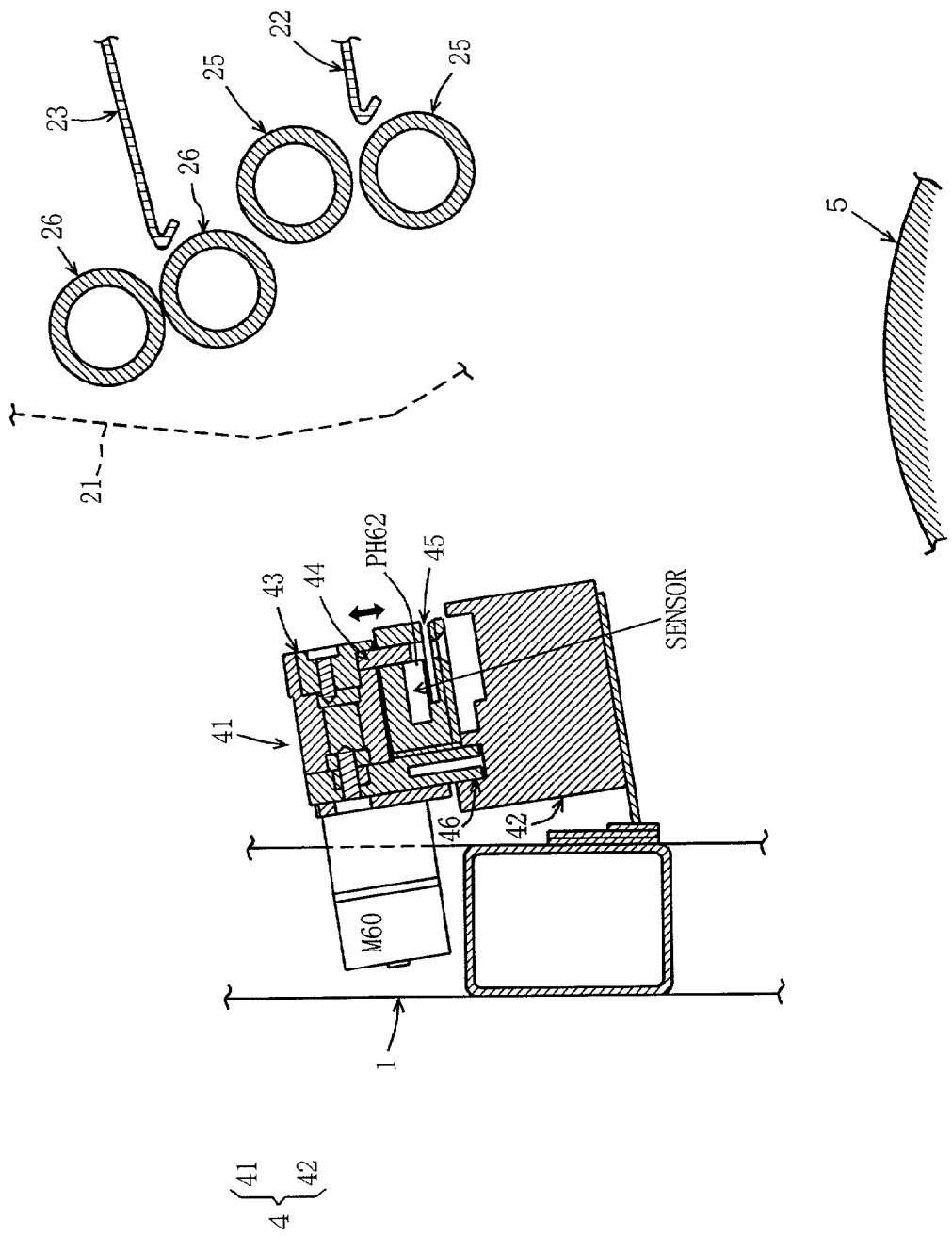
FIG. 23 is a cross-sectional view of a hole punch unit 4, cut along a line E-E' and viewed from the direction of an arrow F of FIG. 20.
Figure 24:
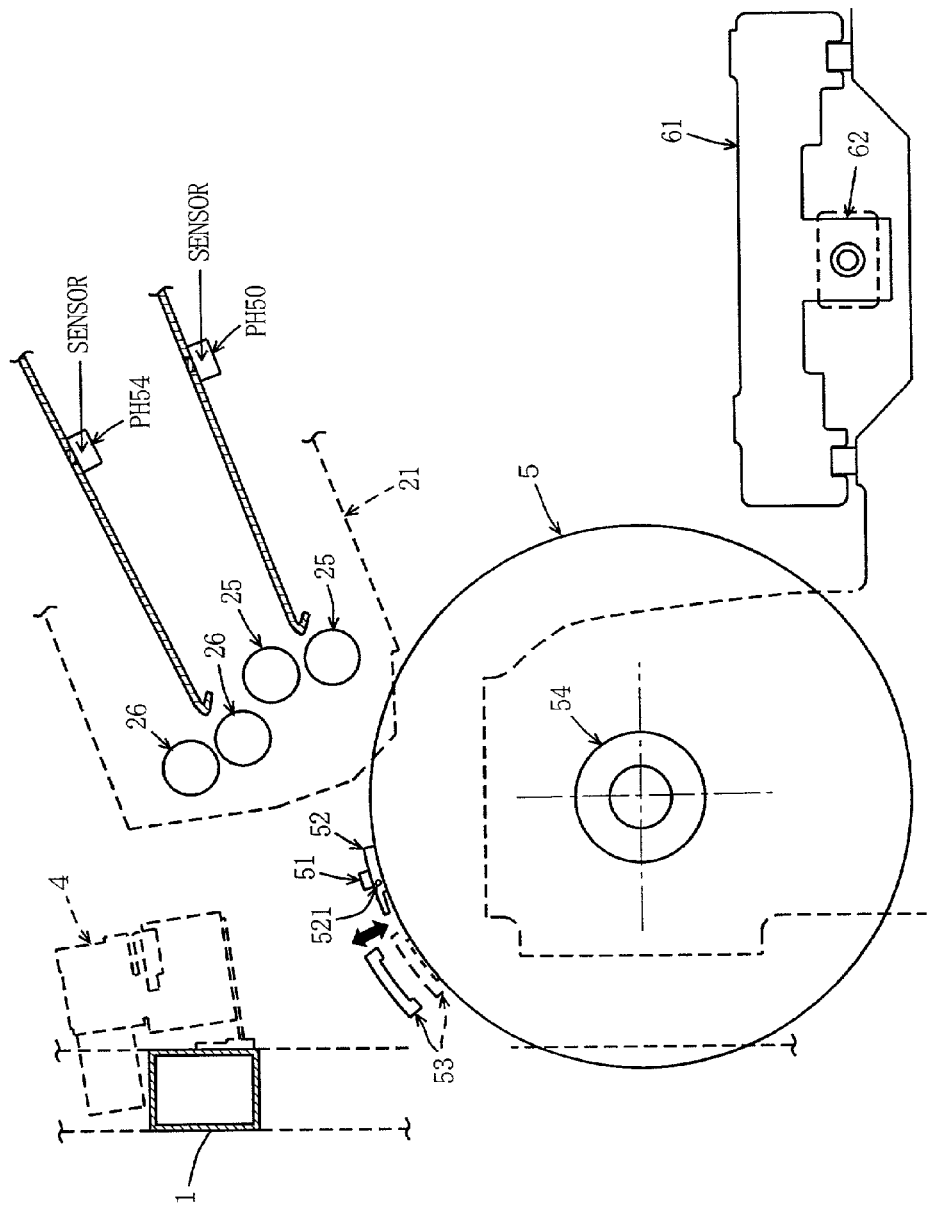
FIG. 24 is a cross-sectional view of a recording drum 5 and other components locating proximal thereto, cut along a line G-G' and viewed from the direction of an arrow H of FIG. 20.
Figure 25:
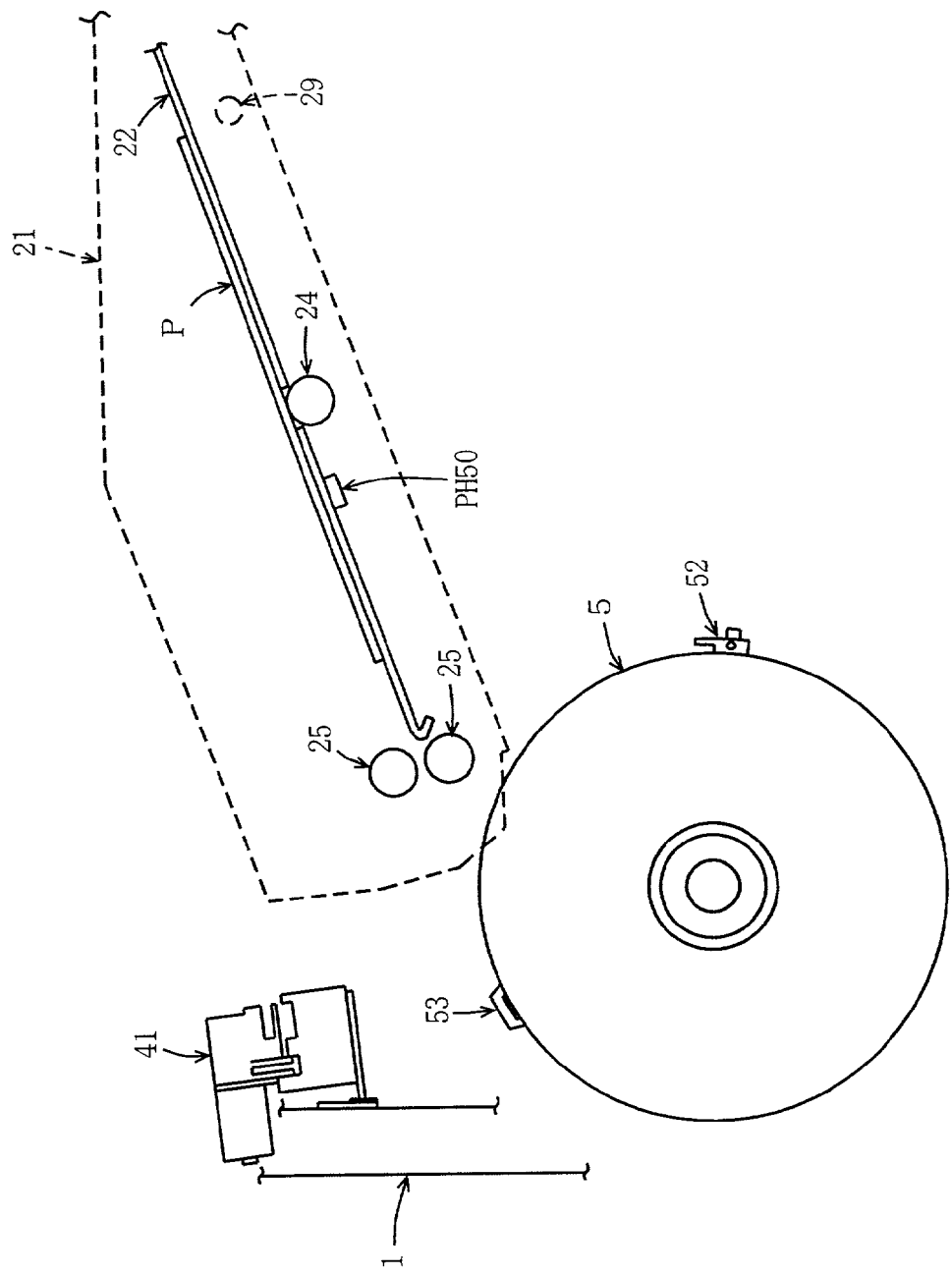
FIGS. 25 to 33 are illustrations demonstrating how a plate P is conveyed by the conventional conveyor mechanism 2.
Figure 26:
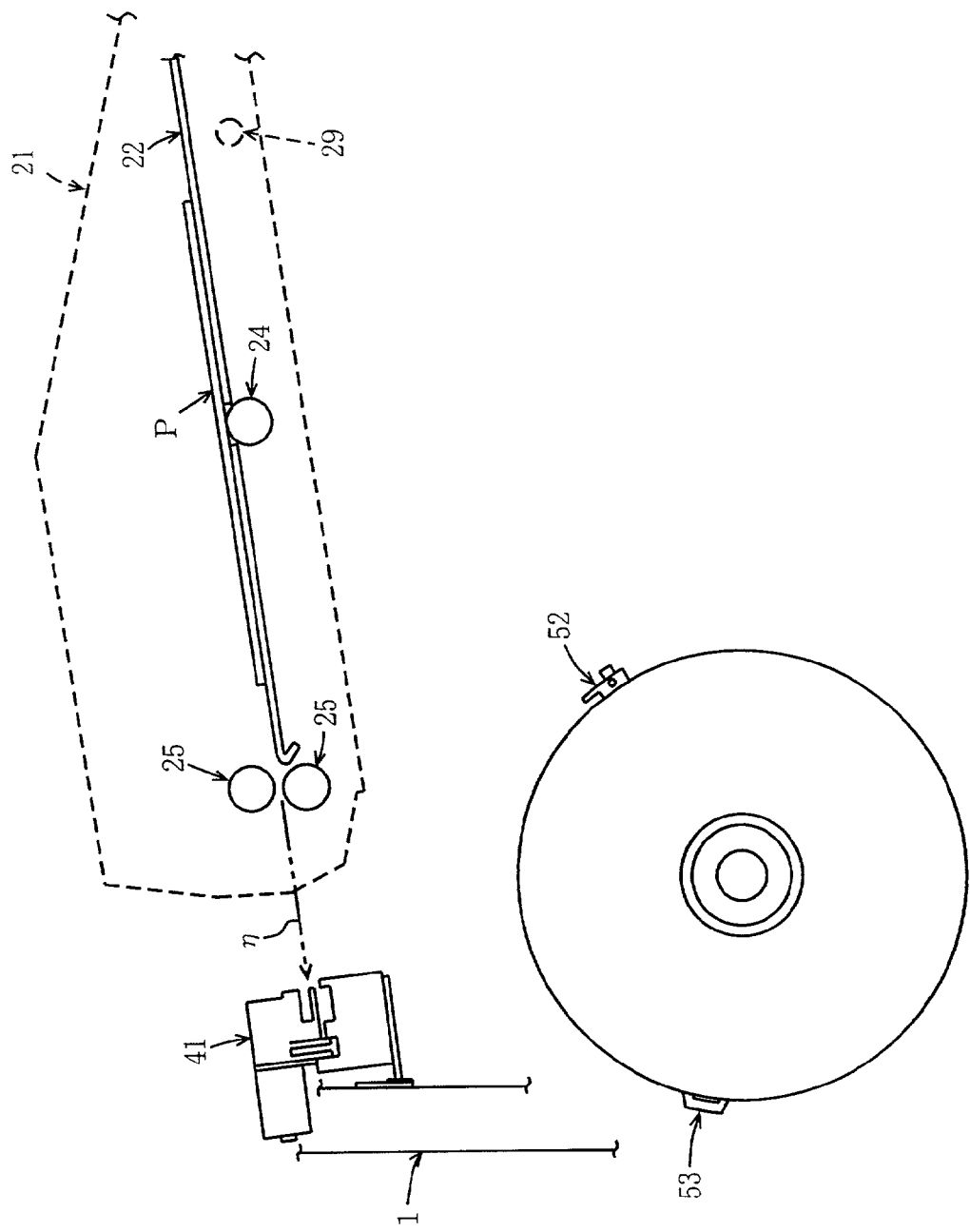
Figure 27:
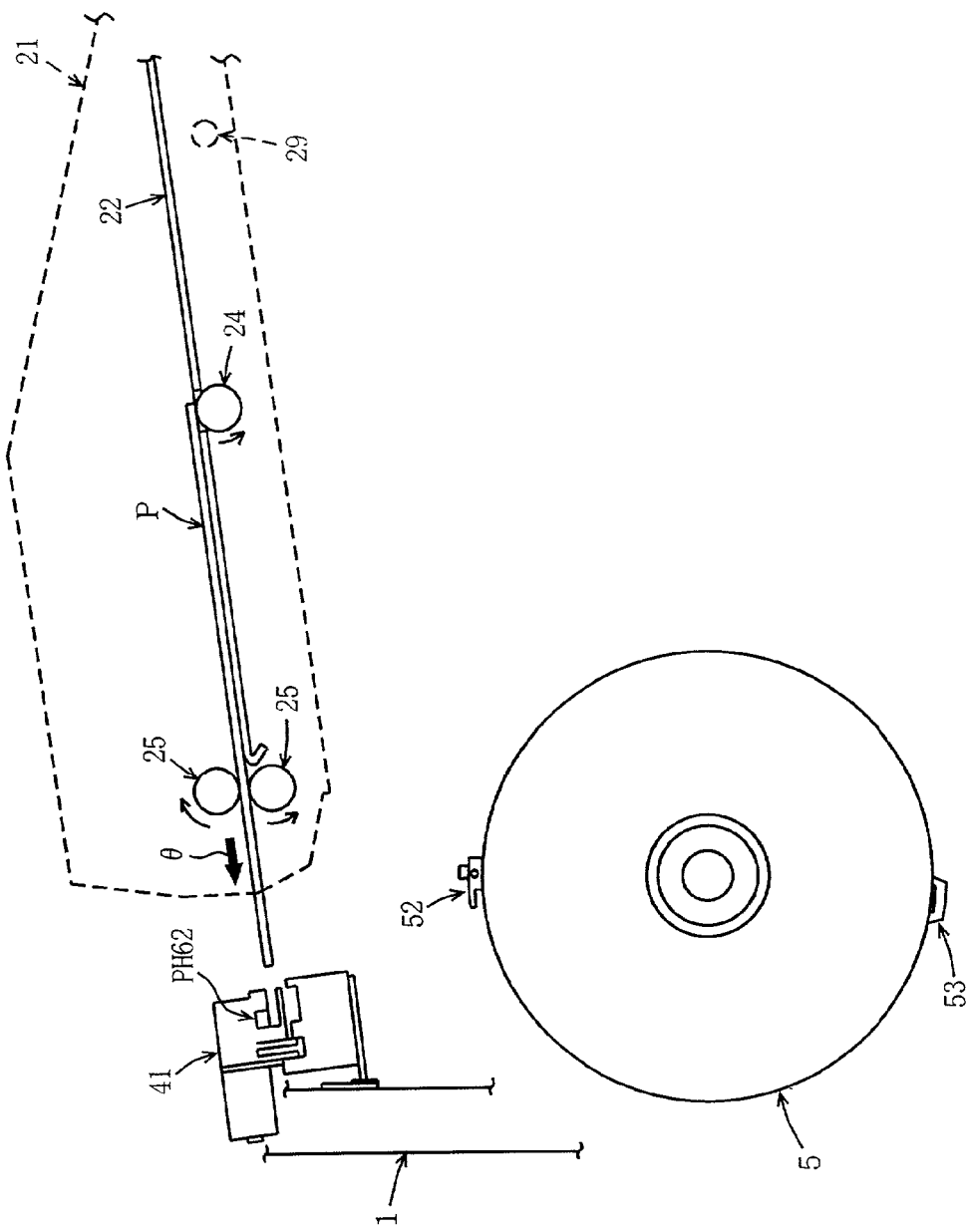
Figure 28:
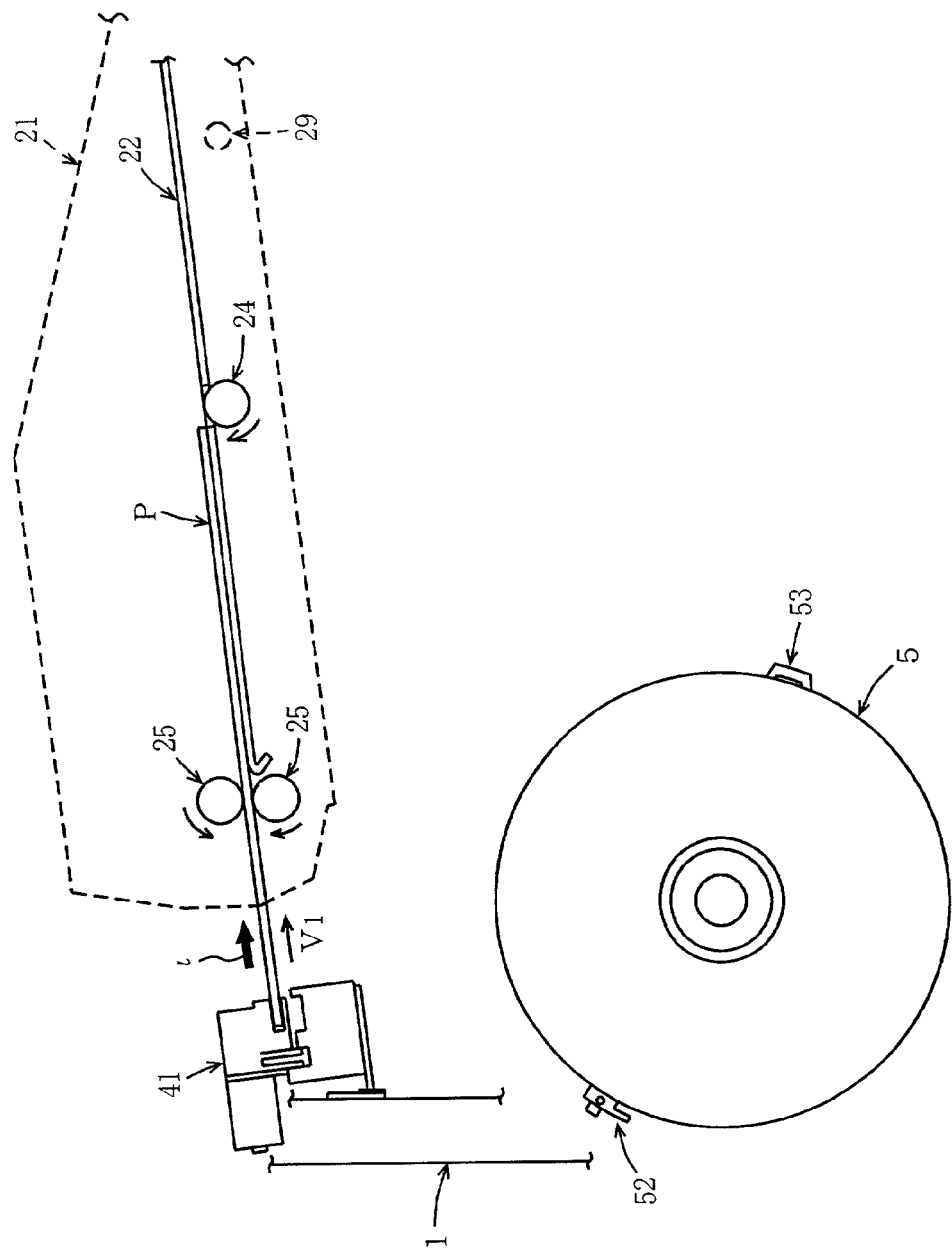
Figure 29:
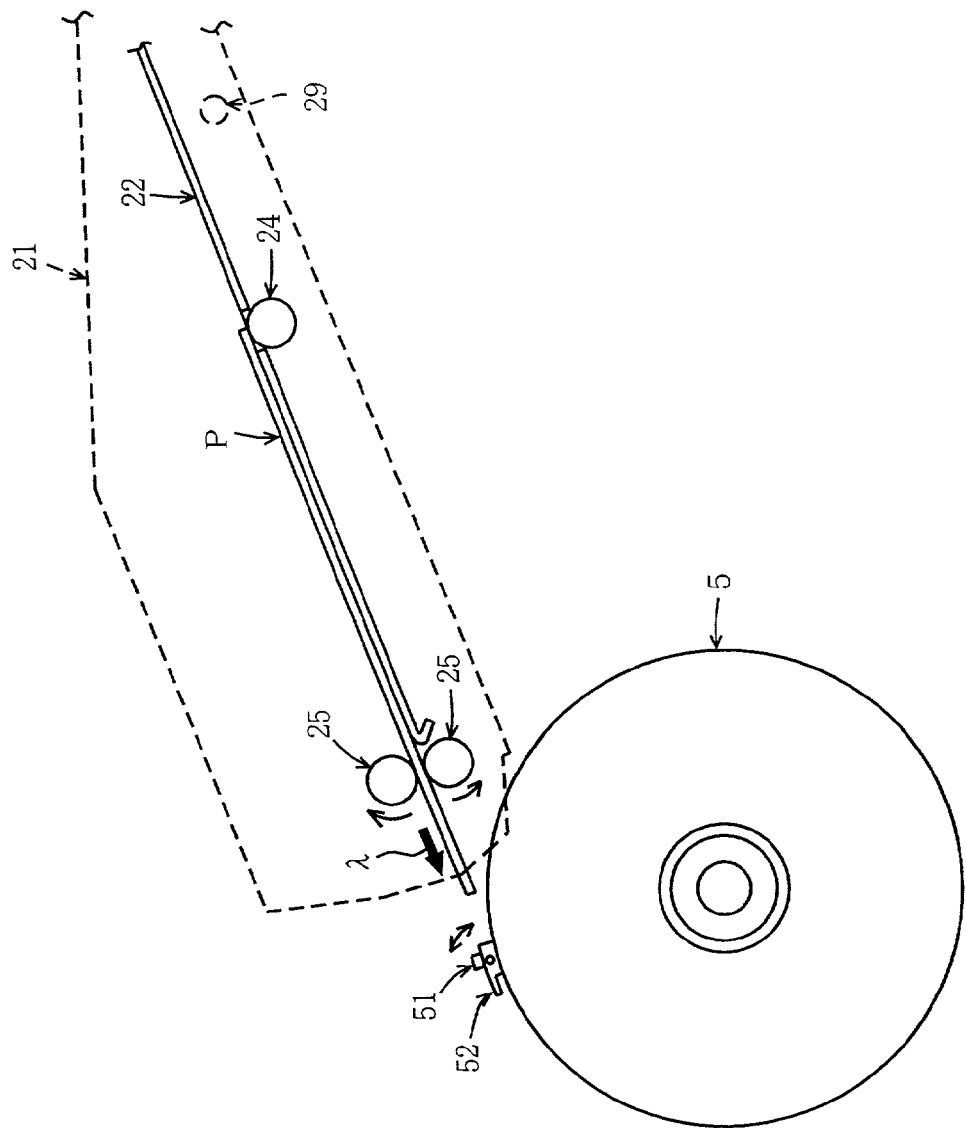
Figure 30:
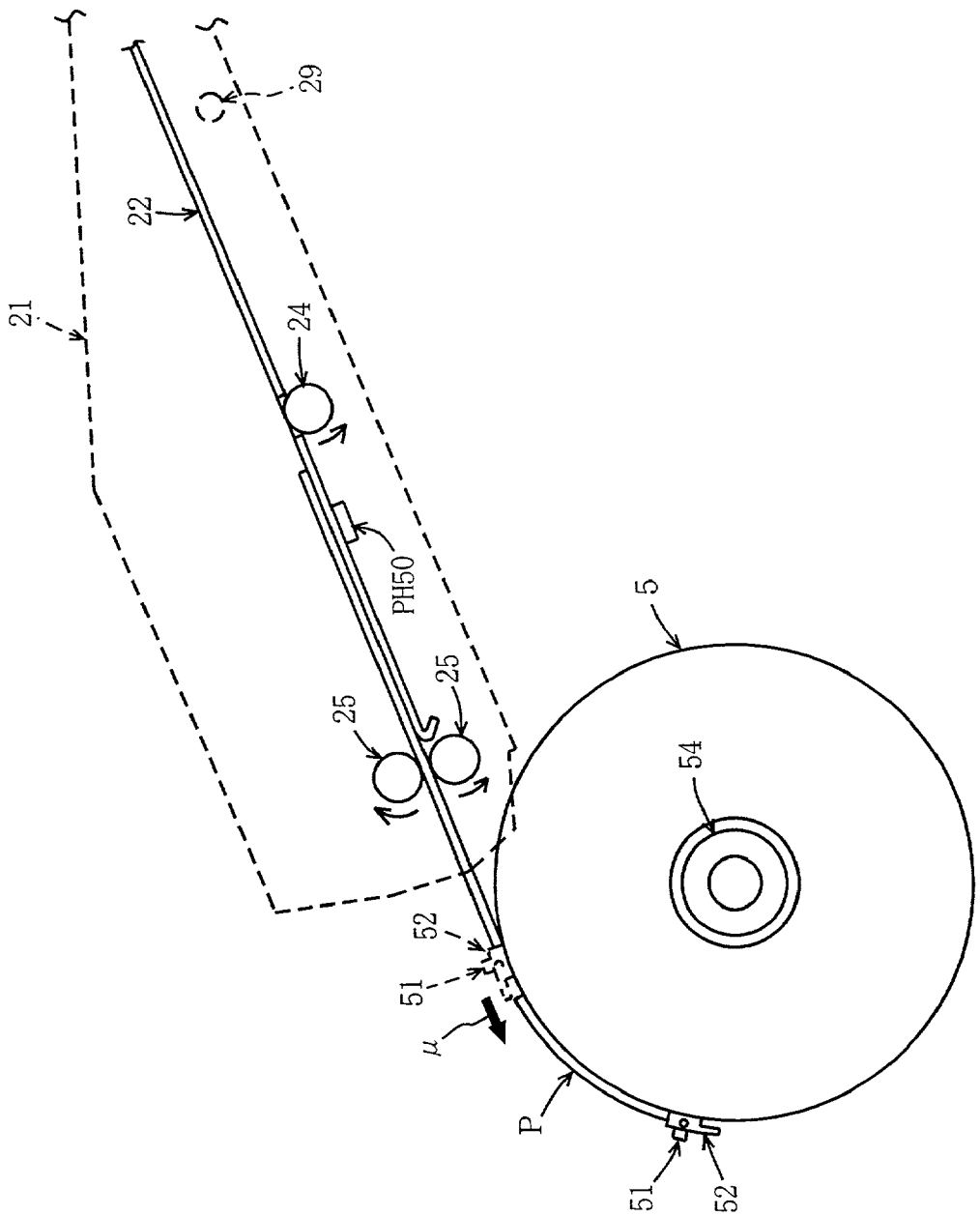
Figure 31:
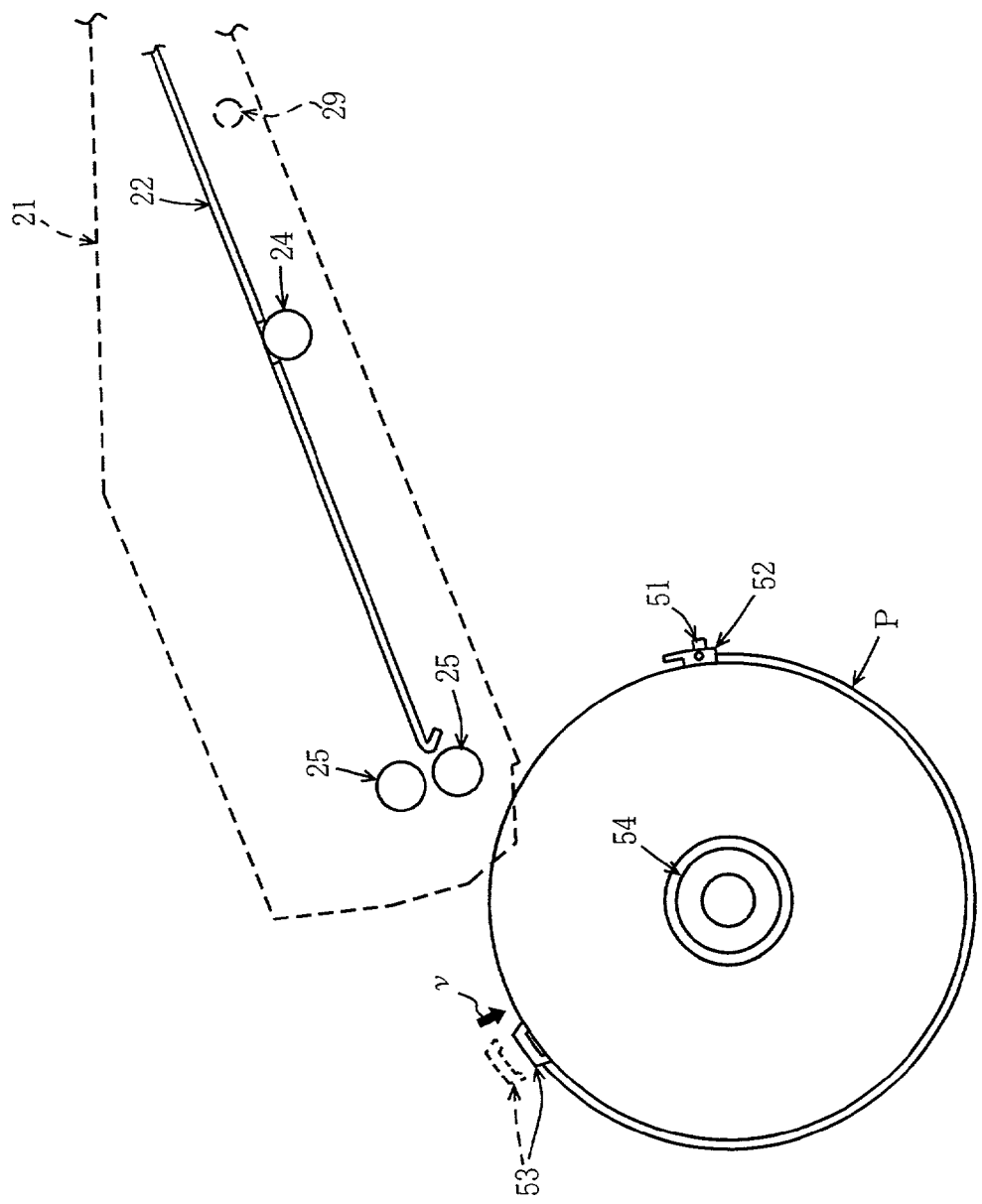
Figure 32:
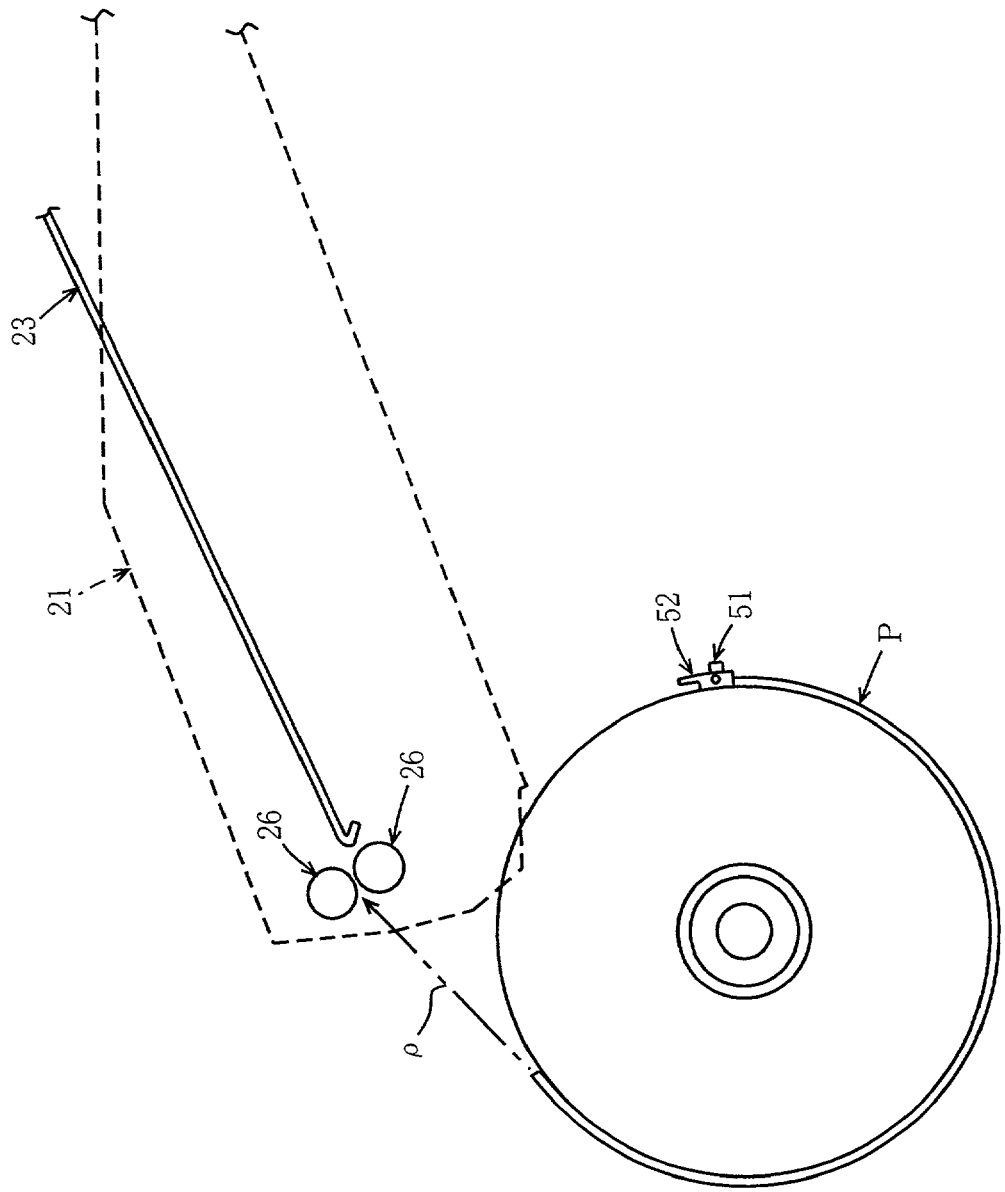
Figure 33:
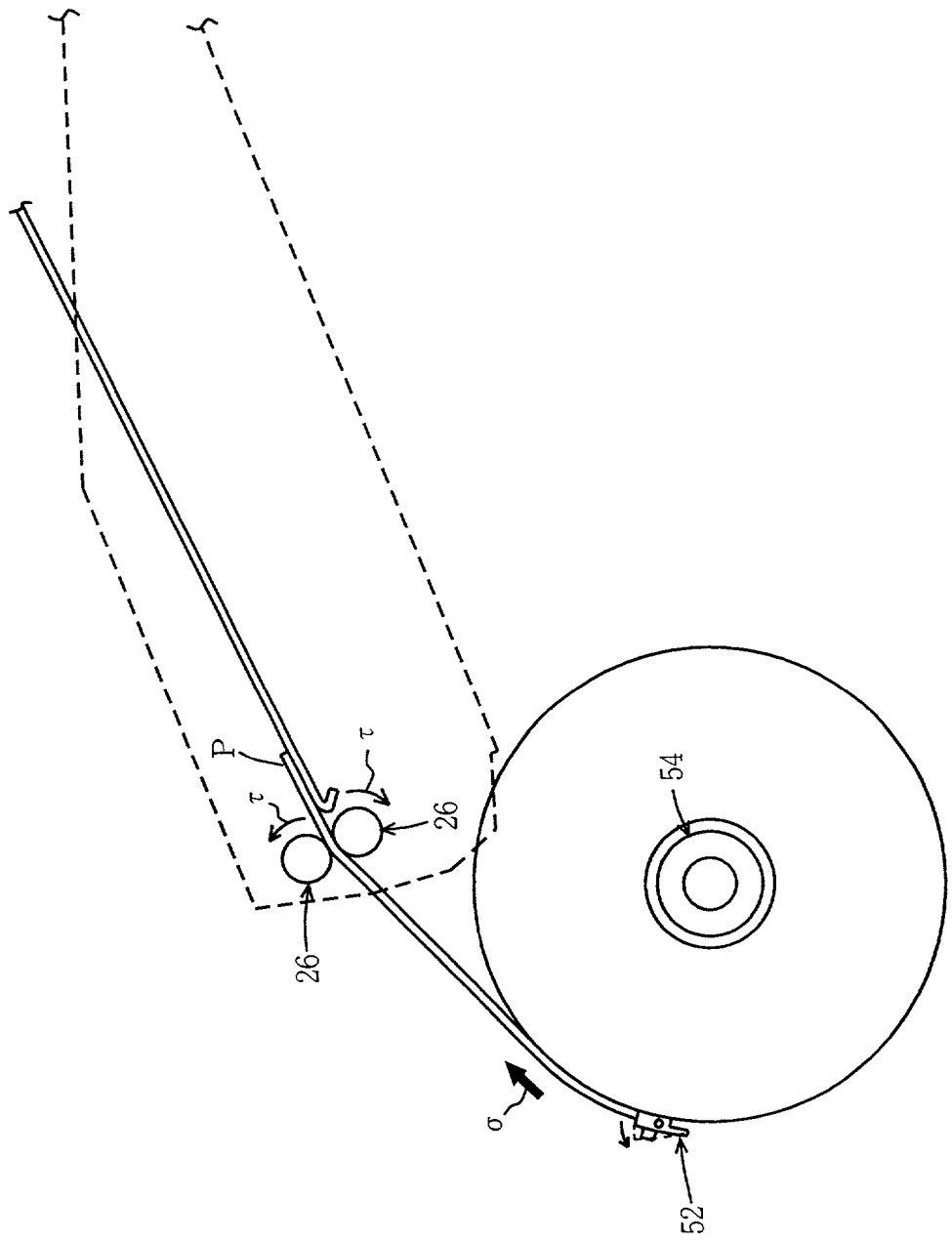

Referring to FIGS. 18 and 19, a sequence of processes for plate conveyance in such a structure are described in detail below.

During when the plate P is conveyed to the recording drum 5 as described above by referring to FIGS. 3 to 15 in the first embodiment, the conveyor mechanism 202 drives the motor M172 to move up the pass switching movable guide 130, consequently establishing a plate loading line (see FIG. 18). After exposing the plate P, the recording drum 5 stops at the same position to which the plate P has been loaded. At the same time, the conveyor mechanism 202 drives the motor M172 to move down the pass switching movable guide 130, consequently establishing a plate unloading line (see FIG. 19). The plate P coming from the recording drum 5 is guided along the lower tray 122 and the pass switching movable guide 130 to the conveyor roller 127. Then, the plate P is unloaded onto the upper tray 123.

Here, in order to make sure to guide the plate P to the conveyor roller 127 along the pass switching movable guide 130, a sensor for detecting whether the guide has been correctly placed may be provided to control the up-and-down movement of the pass switching movable guide 130.

As described in the foregoing, in the conveyor mechanism 202 incorporated in the drum surface scanner of the second embodiment, using the pass switching movable guide 130 successfully achieves plate loading and unloading without causing the recording drum 5 to be positioned differently. This leads to the better throughput in the exposure process.

In the above first and second embodiments, the conveyor belt 111 is plurally arranged in the direction orthogonal to the plate conveyance direction. Alternatively, the conveyor belts 111 may be reduced in number, and the plate P may be conveyed by only those in the center area between the side panels 121. If this is the case, any flat panels such as the lower tray 122 may be provided where there had been the conveyor belts. Such flat panels prevent the side ends of the plate P from interfering with the conveyor belts 111 at the time of centering, and thus the plate P can be centered with accuracy.

While the invention has been described in detail, the foregoing description is in all aspects illustrative and not restrictive. It is understood that numerous other modifications and variations can be devised without departing from the scope of the invention.

What is claimed is:

1. A drum surface scanner including a conveyance unit for conveying a plate to an exposure unit in which the plate is attached to a recording drum for scanning and exposure, said conveyance unit comprising:

a tray on which the plate is placed, which includes a conveyor belt, and as the conveyor belt moves, the plate placed thereon is forwarded towards said exposure unit;

a conveyance member including a roller, configured by a pair of rollers for holding said plate therebetween, which is rotatable in both positive and negative directions, and placed to abut the plate at the tip of said tray with respect to a plate conveyance direction;

a pair of movable pins which are protruding from an upper surface of said tray, placed symmetric with respect to the plate conveyance direction, and made movable towards both the plate conveyance direction and a direction opposite thereto, wherein at the time of plate conveyance towards said exposure unit, said roller rotates in the positive direction to forward the plate, and said movable pins push a tail end of the plate; and release means for releasing the plate held between said pair of rollers between said pair of rollers before a front end of the plate to be conveyed towards said exposure unit is fixed on said recording drum.

2. The drum surface scanner according to claim 1, further comprising a hole punch unit for forming a punched hole and/or a cut in said plate, wherein at the time of plate conveyance towards said hole punch unit, in said conveyance unit, said roller rotates in the positive direction to forward the plate, and said movable pins push a tail end of the plate.

3. The drum surface scanner according to claim 2, wherein said release means releases the plate held between said pair of rollers at a predetermined position in front of said hole punch unit before the front end of the plate to be conveyed towards said hole punch unit reaches said hole punch unit.

4. The drum surface scanner according to claim 1, wherein said movable pins are made to fall to the conveyor belt to be located therebelow in the plate conveyance direction.

5. The drum surface scanner according to claim 4, wherein said movable pins are caused to fall at predetermined positions to be fit in said tray.

6. A drum surface scanner including a conveyance unit for conveying a plate to an exposure unit in which the plate is attached to a recording drum for scanning and exposure, said conveyance unit comprising:

a tray on which the plate is placed, which includes a conveyor belt, and as the conveyor belt moves, the plate placed thereon is forwarded towards said hole punch unit;

a conveyance member including a roller, configured by a pair of rollers for holding said plate therebetween, which is rotatable in both positive and negative directions, and placed to abut the plate at the tip of said tray with respect to a plate conveyance direction;

a pair of movable pins which are protruding from an upper surface of said tray, placed symmetric with respect to the plate conveyance direction, and made movable towards both the plate conveyance direction and a direction opposite thereto, wherein at the time of plate conveyance towards said exposure unit, said roller rotates in the positive direction to forward the plate, and said movable pins push a tail end of the plate;

a hole punch unit for forming a punched hole and/or a cut in said plate, wherein at the time of plate conveyance towards said hole punch unit, in said conveyance unit, the roller of said conveyance member rotates to forward the plate, and said movable pins push a tail end of the plate; and release means for releasing the plate held between said pair of rollers before a front end of the plate to be conveyed towards said hole punch unit is punched in by said hold punch unit.

7. The drum surface scanner according to claim 6, wherein said movable pins are made to fall to the conveyor belt to be located therebelow in the plate conveyance direction.

8. The drum surface scanner according to claim 7, wherein said movable pins are automatically fell at predetermined positions to be fit in said tray.

9. A drum surface scanner including a conveyance unit for conveying a plate to an exposure unit in which the plate is attached to a recording drum for scanning and exposure, said conveyance unit comprising:

a tray on which the plate is placed;

a conveyance member including a roller which is rotatable in both positive and negative directions, and placed to abut the plate at the tip of said tray with respect to a plate conveyance direction; and a pair of movable pins which are protruding from an upper surface of said tray, made to fall to said tray to be located therebelow in the plate conveyance direction, placed symmetric with respect to the plate conveyance direction, and made movable towards both the plate conveyance direction and a direction opposite thereto, wherein at the time of plate conveyance towards said exposure unit, said roller rotates in the positive direction to forward the plate, and said movable pins push a tail end of the plate.

10. The drum surface scanner according to claim 9, wherein said movable pins are caused to fall at predetermined positions to be fit in said tray.

* * * * *